(12) United States Patent
Kawahara

(10) Patent No.: US 8,589,596 B2
(45) Date of Patent: Nov. 19, 2013

(54) DATA TRANSFER CONTROLLING APPARATUS, SYSTEM AND METHOD

(75) Inventor: Jun Kawahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 45 days.

(21) Appl. No.: 13/240,718

(22) Filed: Sep. 22, 2011

(65) Prior Publication Data

US 2012/0011277 A1    Jan. 12, 2012

Related U.S. Application Data

(63) Continuation of application No. PCT/JP2009/001459, filed on Mar. 30, 2009.

(51) Int. Cl.
G06F 15/16 (2006.01)
G06F 15/76 (2006.01)

(52) U.S. Cl.
USPC .............................. 709/253; 712/29; 710/317

(58) Field of Classification Search
USPC .................. 709/205, 253; 710/317; 712/29
See application file for complete search history.

(56) References Cited

U.S. PATENT DOCUMENTS

| | | | | | |
|---|---|---|---|---|---|
| 4,811,210 | A | * | 3/1989 | McAulay | 710/317 |
| 5,261,109 | A | * | 11/1993 | Cadambi et al. | 710/111 |
| 5,655,079 | A | | 8/1997 | Hirasawa et al. | |
| 5,740,170 | A | * | 4/1998 | Andou et al. | 370/390 |
| 5,910,178 | A | * | 6/1999 | Moh et al. | 709/232 |
| 6,032,205 | A | | 2/2000 | Ogimoto et al. | |
| 7,036,114 | B2 | * | 4/2006 | McWilliams et al. | 717/149 |
| 7,069,392 | B2 | * | 6/2006 | Kota et al. | 711/141 |
| 7,752,378 | B2 | * | 7/2010 | Fukumura et al. | 710/317 |
| 2004/0255002 | A1 | * | 12/2004 | Kota et al. | 709/213 |
| 2008/0320272 | A1 | * | 12/2008 | Fukumura et al. | 712/13 |

FOREIGN PATENT DOCUMENTS

| | | |
|---|---|---|
| EP | 0 411 497 A2 | 2/1991 |
| EP | 0 726 663 A2 | 8/1996 |
| JP | 3-62255 | 3/1991 |
| JP | 8-214015 | 8/1996 |
| JP | 10-97512 | 4/1998 |
| JP | 10-254843 | 9/1998 |
| JP | 10-336175 | 12/1998 |
| JP | 11-232236 | 8/1999 |
| JP | 2005-20394 | 1/2005 |

OTHER PUBLICATIONS

International Search Report for PCT/JP2009/001459 mailed Jun. 2, 2009.
Office Action mailed Jun. 4, 2013 in corresponding Japanese Application No. 2011-508056.

* cited by examiner

Primary Examiner — Douglas Blair
(74) Attorney, Agent, or Firm — Staas & Halsey LLP

(57) ABSTRACT

A data transfer controlling apparatus includes a first controlling unit that performs a broadcast transfer to a plurality of nodes connected to a first route switching device, and requests a second node representing nodes connected to a second route switching device that is connected to the first route switching device to perform a broadcast transfer when the first controlling unit receives a request of the broadcast transfer from a first node connected to the first route switching device, and a second controlling unit that performs the broadcast transfer to all of nodes connected to the first route switching device when the second controlling unit receives a request of a broadcast transfer from the second node.

7 Claims, 17 Drawing Sheets

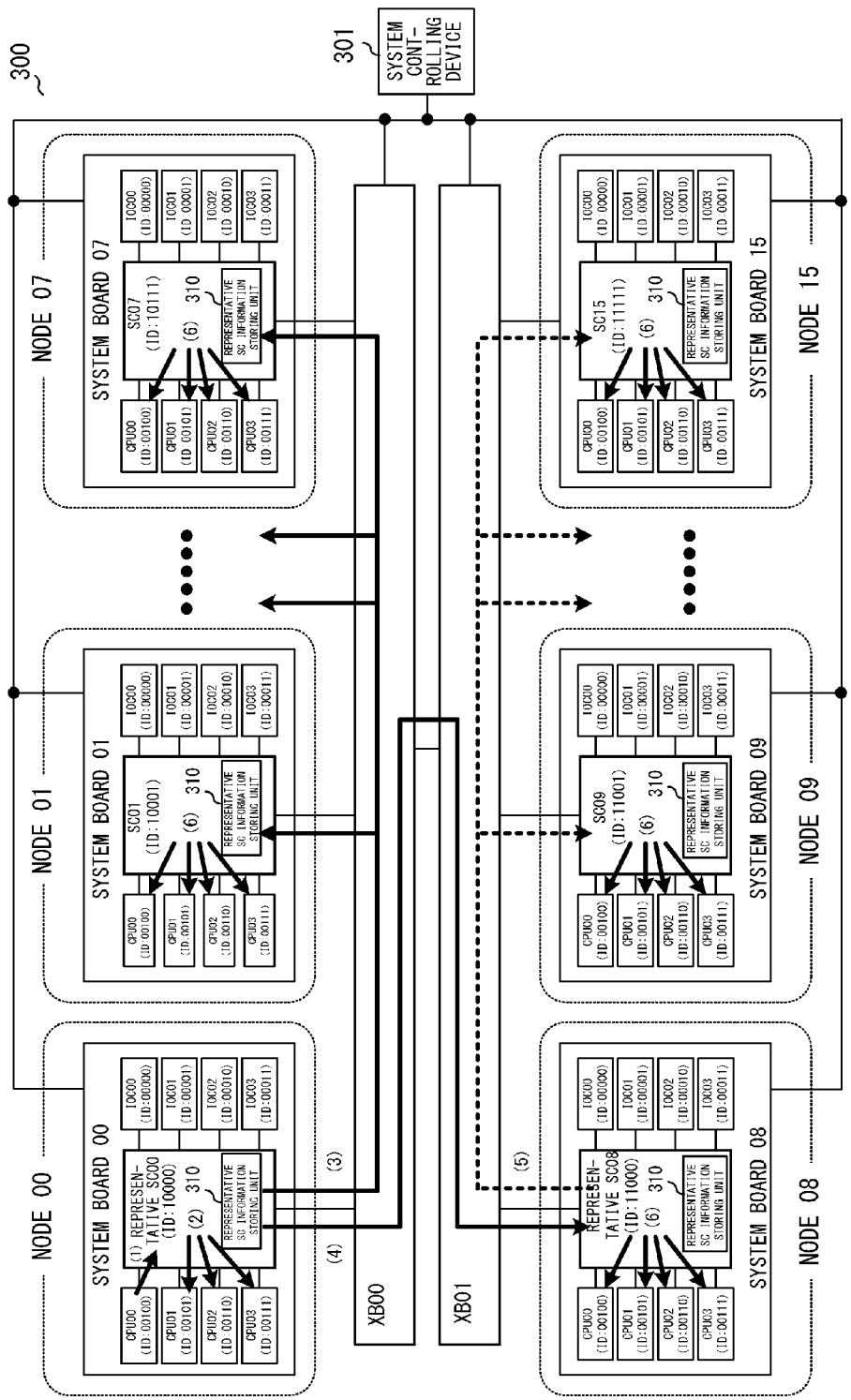
F I G. 3

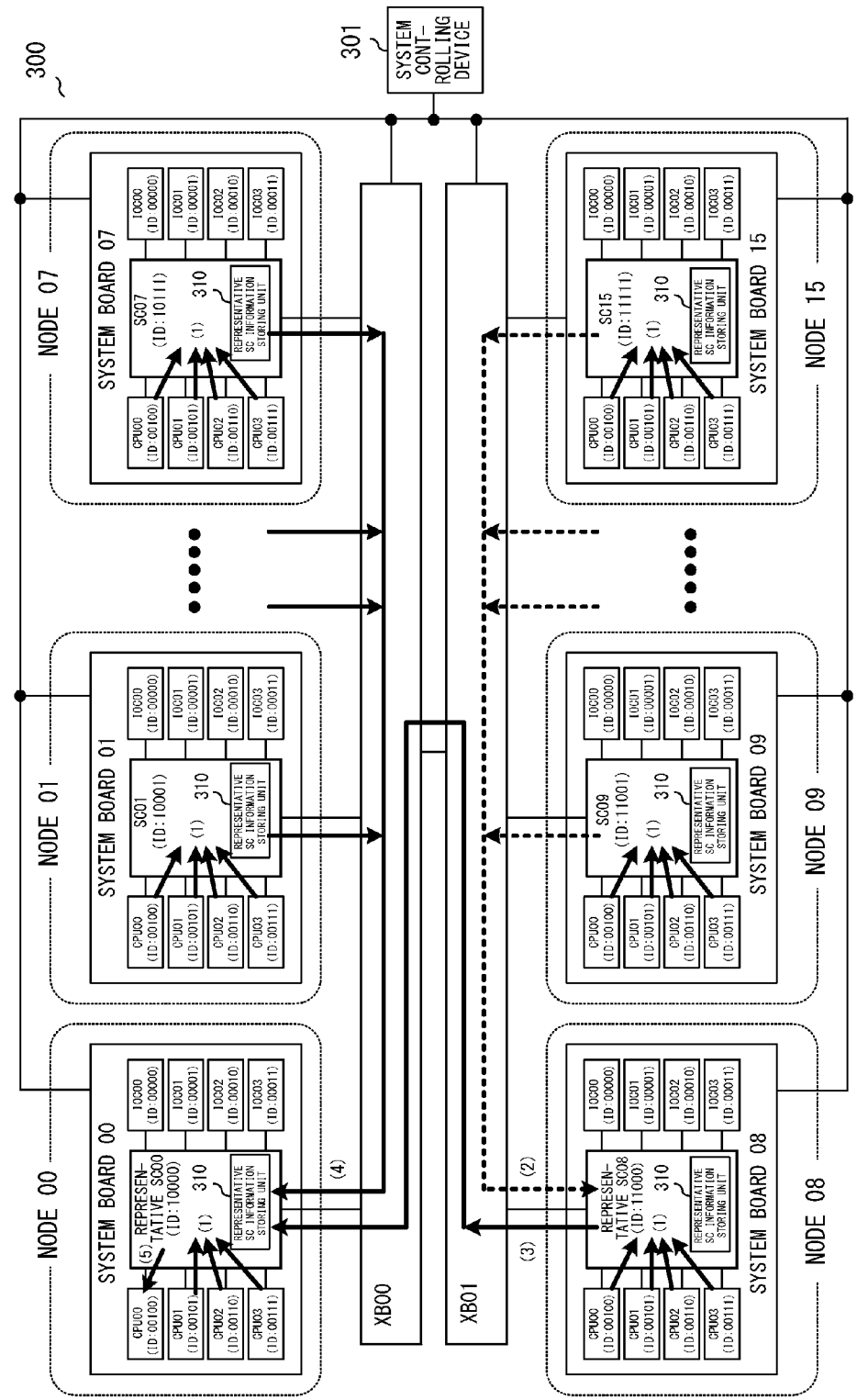
F I G. 4

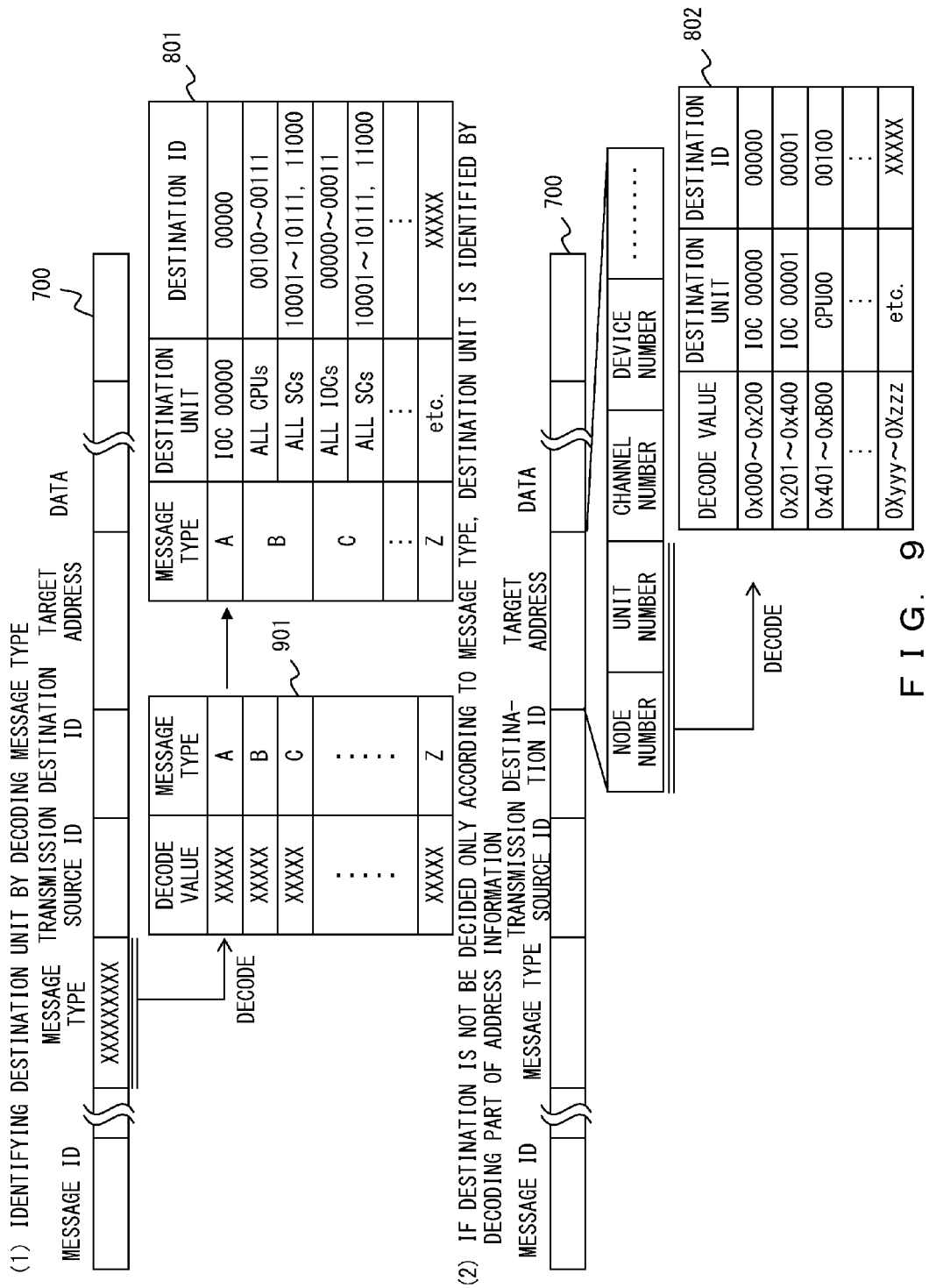
F I G. 9

F I G. 1 2

1100

| NEW MESSAGE ID | VALID FLAG | OLD MESSAGE ID | OLD TRANSMISSION SOURCE ID | TRANSMISSION DESTINATION LIST | TRANSMISSION WAITING LIST | BC RESPONSE CONTENT | REQUEST TYPE |
|---|---|---|---|---|---|---|---|
| 00000 | x | XXXXXX | XXXXX | XXXXXXXXXXXX | XXXXXXXXXXXX | XXXXXX | XXX |
| ... | ... | ... | ... | ... | ... | ... | ... |
| 11111 | x | XXXXXX | XXXXX | XXXXXXXXXXXX | XXXXXXXXXXXX | XXXXXX | XXXX |

TRANSMISSION DESTINATION LIST

| LOCAL NODE CPU0 | ... | LOCAL NODE CPU3 | NODE 0 SC | NODE 1 SC | NODE 2 SC | ... | NODE 15 SC |
|---|---|---|---|---|---|---|---|
| 1 | ... | 1 | 0 | 1 | 1 | ... | 1 |

TRANSMISSION WAITING LIST

| LOCAL NODE CPU0 | ... | LOCAL NODE CPU3 | NODE 0 SC | NODE 1 SC | NODE 2 SC | ... | NODE 15 SC |
|---|---|---|---|---|---|---|---|
| 1 | ... | 1 | 0 | 0 | 0 | ... | 1 |

| REQUEST TYPE=001 (RESPONSE TO POWER CONTROL REQUEST) 1401 ||
|---|---|
| PRIORITY | BC RESPONSE CONTEN |
| 1 | 1111 |
| 2 | 1110 |
| ⋮ | ⋮ |
| 15 | 0001 |
| 16 | 0000 |

| REQUEST TYPE=010 (RESPONSE TO SNOOP REQUEST) 1402 ||
|---|---|
| PRIORITY | BC RESPONSE CONTENT |
| 1 | XXXXXXX |
| 2 | XXXXXXX |
| ⋮ | ⋮ |
| 7 | XXXXXXX |
| 8 | XXXXXXX |

F I G. 1 4

DATA TRANSFER CONTROLLING APPARATUS, SYSTEM AND METHOD

CROSS-REFERENCE TO RELATED APPLICATION

This application is a continuation application of International Application PCT/JP2009/001459 filed on Mar. 30, 2009 and designated the U.S., the entire contents of which are incorporated herein by reference.

FIELD

An aspect of the present invention relates to a data transfer controlling apparatus, system and method.

BACKGROUND

Conventionally, a multiprocessor system includes CPUs (Central Processing Units) as a plurality of arithmetic device unit. Moreover, crossbars as data transfer controlling apparatuses each of which is a switching mechanism for quickly and efficiently making a data transfer between devices, for example, between CPUs, between a CPU and a memory, and the like, are used in the multiprocessor system.

FIGS. 1 and 2 are explanatory views of a broadcast transfer made in a multiprocessor system 100.

The multiprocessor system 100 illustrated in FIGS. 1 and 2 include system boards 00 to 15, and crossbars XB 00 and 01.

The multiprocessor system 100 illustrated in FIGS. 1 and 2 illustrate a case where the system boards 00 to 15 respectively configure one node. Nodes are the independent unit of processing implemented by a processor group composed of one or two or more CPUs, and an SC (System Controller) or the like as a memory controller.

The nodes 00 to 07 are connected to a crossbar XB 00, and make a data transfer among the nodes via the crossbar XB 00. Similarly, the nodes 08 to 15 are connected to a crossbar XB 01, and make a data transfer among the nodes via the crossbar XB 01.

Additionally, the crossbar XB 00 and the crossbar XB 01 are communicatively connected. An arbitrary node subordinate to the crossbar XB 00 can make a data transfer to an arbitrary node subordinate to the crossbar XB 01.

Arrows illustrated in FIG. 1 indicate a flow of a process executed when a CPU within the node 00 issues a request of a broadcast transfer to all the CPUs within the system.

(1) The CPU within the node 00 issues only one request of the broadcast transfer to the SC 00 that controls the node 00. The CPU that has issued the request of the broadcast transfer is hereinafter referred to as a requester.

(2) Then, the SC 00 transmits the request to the CPUs other than the requester within the node 00, and the SCs of the nodes 01 to 15.

(3) The SCs of the nodes 01 to 15, which have received the request from the SC 00, respectively transmit the request to the CPUs of the local nodes themselves.

In contrast, arrows illustrated in FIG. 2 indicate a flow of a process of a response to the request of the broadcast transfer made, which is made by the node 00.

(1) The CPUs other than the requester within the node 00 transmit a response to the received request of the broadcast transfer to the SC 00.

(2) Additionally, the CPUs within the nodes 01 to 15 respectively transmit a response to the received request of the broadcast transfer to the SC of the local nodes.

(3) Then, the SCs 01 to 07 respectively transmit responses to the SC 00 of the node 00 via the crossbar XB 00.

(4) Additionally, the SCs 08 to 15 respectively transmit a response to the SC 00 of the node 00 via the crossbars XB 01 and XB 00.

(5) The SC 00 notifies the requester of reception results upon receipt of the responses from all the CPUs.

Related to the above described technique, a method for making a data transfer among processors, which enables a broadcast transfer among threads even if the plurality of threads are assigned to the same node is known.

Additionally, also a broadcast communication method for avoiding a deadlock of broadcast messages within a switch-type network in a parallel computer where a plurality of processors are connected by the network is known.

Furthermore, a monitor data collection method for collecting monitor data in a switch-type network at low cost in real time in a parallel computer where a plurality of nodes are connected by the network is known.

Still further, a packet transfer controlling apparatus that can reduce the length of time needed to detect a timeout while preventing the performance of a communication system from being degraded is known.

Patent Document 1: Japanese Laid-open Patent Publication No. 10-097512
Patent Document 2: Japanese Laid-open Patent Publication No. 10-254843
Patent Document 3: Japanese Laid-open Patent Publication No. 11-232236
Patent Document 4: Japanese Laid-open Patent Publication No. 2005-020394

SUMMARY

An aspect of the data transfer controlling apparatus is a data transfer controlling apparatus for controlling a data transfer among a plurality of nodes in an information processing apparatus including a plurality of route switching devices to each of which a plurality of nodes are connected, and the data transfer controlling apparatus includes the following components.

A first controlling unit performs a broadcast transfer to a plurality of nodes connected to a first route switching device.

Additionally, the first controlling unit requests a second node representing nodes connected to a second route switching device that is connected to the first route switching device to perform a broadcast transfer when the first controlling unit receives a request of the broadcast transfer from a first node connected to the first route switching device.

A second controlling unit performs the broadcast transfer to all of the nodes connected to the first route switching device when the second controlling unit receives a request of a broadcast transfer from the second node.

BRIEF DESCRIPTION OF DRAWINGS

FIG. 3 illustrates a principal part of a multiprocessor system 300, and an outline of a broadcast transfer;

FIG. 4 illustrates an outline of a response process to the broadcast transfer illustrated in FIG. 3;

FIG. 9 is an explanatory view of a process of a destination determining unit 530;

FIG. 12 is an explanatory view of the transmission information 1100 stored in the transmission information storing unit 550;

FIG. 14 is an explanatory view of the transmission information 1100 stored in the transmission information storing unit 550;

DESCRIPTION OF EMBODIMENTS

Figure 1:
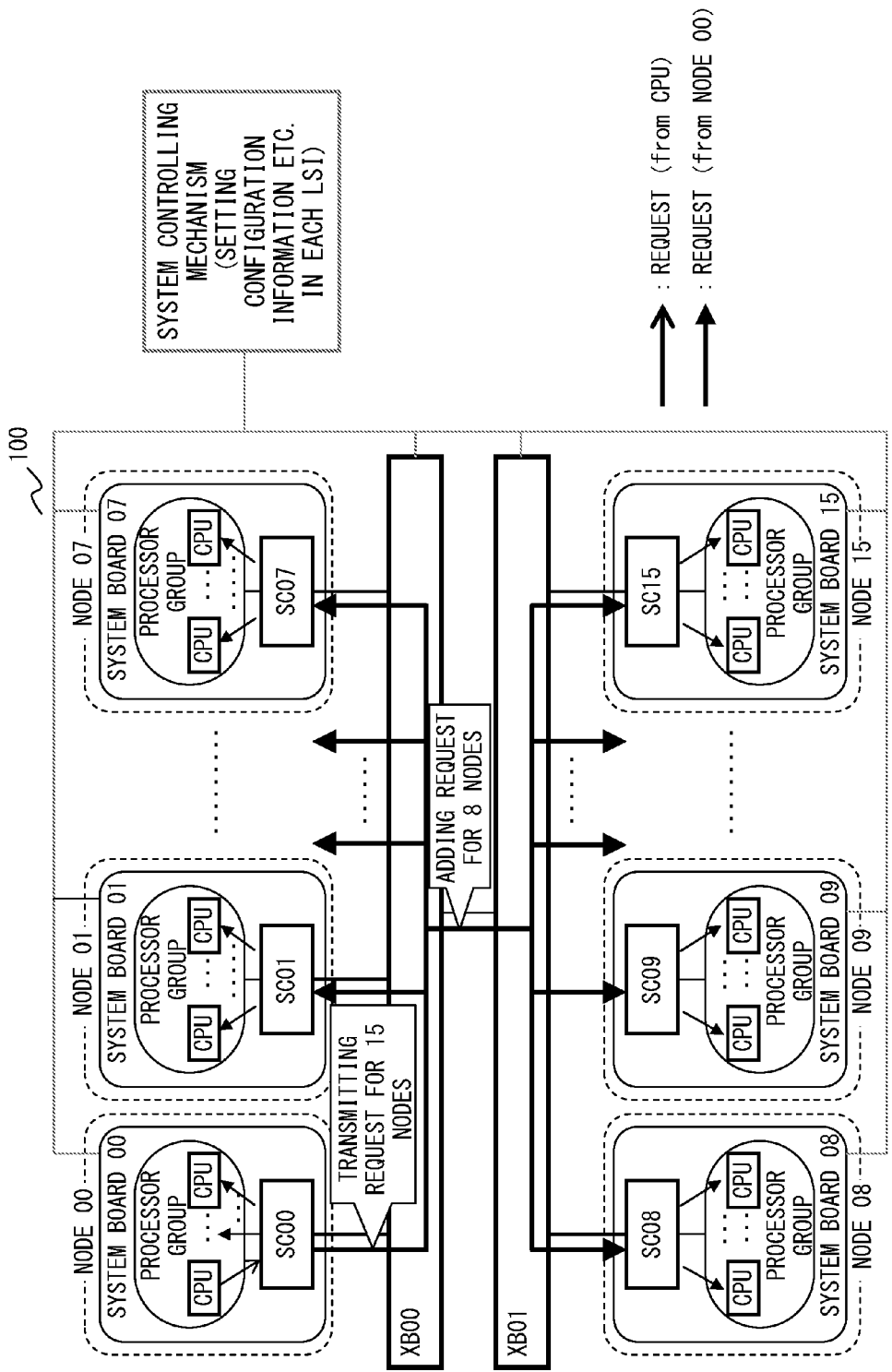
FIG. 1 is an explanatory view of a broadcast transfer in a multiprocessor system 100.

As illustrated in FIG. 1, the requests for the 15 nodes pass between the SC 00 and the crossbar XB 00 when a broadcast transfer is made. Moreover, the requests for the eight nodes pass between the crossbars XB 00 and XB 01.

Figure 2:
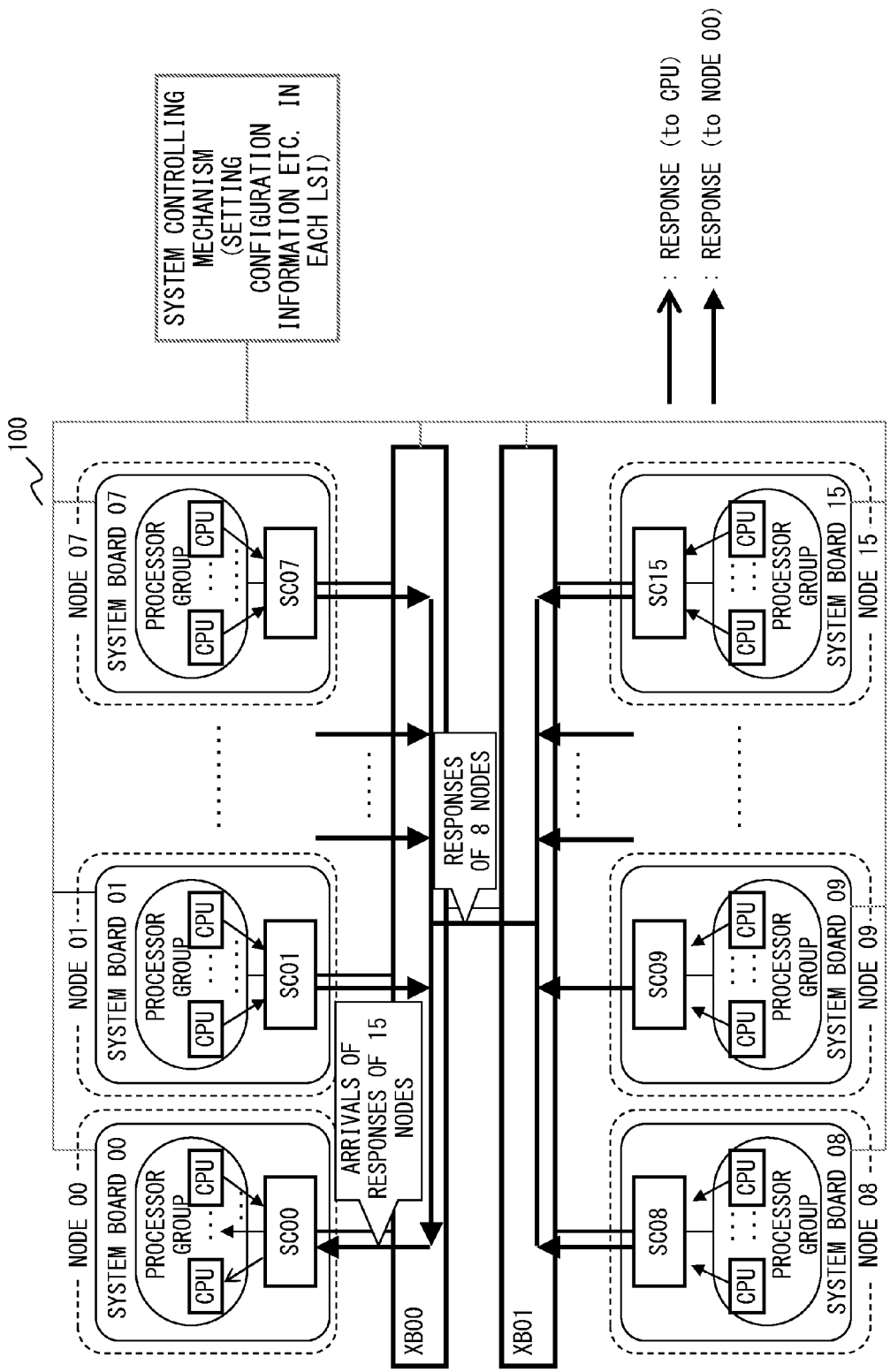
FIG. 2 is an explanatory view of the broadcast transfer in the multiprocessor system 100.

Additionally, in the response process to the broadcast transfer, the responses for the eight nodes pass between the crossbars XB 01 and XB 00 as illustrated in FIG. 2. Moreover, the responses for 15 nodes pass between the crossbar XB 00 and the SC 00.

Normally, a transmission bandwidth between different devices (or different boards), such as between the crossbars XB 00 and XB 01, is narrow. Accordingly, if many requests of a broadcast transfer, such as a snoop request or the like, occur among the nodes subordinate to the crossbar XB 00 and those subordinate to the crossbar XB 01, traffic is caused between the crossbars XB 00 and XB 01 by the number of nodes subordinate to an opposing crossbar.

As a result, a bottleneck is caused by a squeeze of the bandwidth between the crossbars XB 00 and XB 01, leading to possible performance degradation.

One embodiment of the present invention is described below with reference to FIGS. 3 to 17.

FIG. 3 illustrates a principal part of a multiprocessor system 300, and an outline of a broadcast transfer.

The multiprocessor system 300 includes system boards 00 to 15, a crossbar XB 00 to which system boards 00 to 07 are connected, a crossbar XB 01 to which system boards 08 to 15 are connected, and a system controlling device 301 for controlling the entire system.

The system boards 00 to 15 respectively include CPU 00 to CPU 03, IOCs (Input/Output Controllers) 00 to 03, and an SC for controlling units mounted on a system board.

The CPUs 00 to 03 are arithmetic devices for respectively executing a predetermined program.

To the CPU 00, the CPU 01, the CPU 02 and the CPU 03, 00100 (binary number), 00101 (binary number), 00110 (binary number) and 00111 (binary number) are respectively assigned as a unit ID (Identification Data) for identifying each unit.

A unit ID number for identifying a unit is simply abbreviated to "ID" hereinafter. In this embodiment, an ID represented with a binary number of 5 digits is used.

The IOCs 00 to 03 are input/output control devices (I/O Controllers) for controlling a data input/output to/from an external storage device, a network or the like.

To the IOC 00, the IOC 01, the OIC 02 and the IOC 03, 00000, 00001, 00010 and 00011 are respectively assigned as an ID.

This embodiment assumes that all the IDs assigned to the CPUs 00 to 03 and the IOCs 00 to 03 respectively within the system boards 00 to 15 are identical. For example, the ID of all the CPUs 00 within the system boards 00 to 15 is 00100. Similarly, the ID of all the IOCs 00 within the system boards 00 to 15 is 00000.

The SCs 00 to 15 control a data transfer of units such as a CPU, an IOC and the like mounted on each system board. The SCs 00 to 15 include a representative SC information storing unit 310 to store representative SC information for identifying a representative SC.

To the SC 00, the SC 01, ..., the SC 07, which are connected to the crossbar XB 00, 10000, 10001, ..., 10111 are respectively assigned as an ID. Similarly, to the SC 08, the 09, ..., the SC 15, which are connected to the crossbar XB 01, 11000, 11001, ..., 11111 are respectively assigned as an ID.

The representative SC is an SC responsible for part of a broadcast process on behalf of all SCs connected to the same crossbar. Only one representative SC is set for each crossbar. For example, an SC responsible for part of the broadcast process on behalf of all the SCs connected to the crossbar XB 00 is referred to as a representative SC subordinate to the crossbar XB 00.

This embodiment assumes that a representative SC subordinate to the crossbar XB 00 is the SC 00 and a representative SC subordinate to the crossbar XB 01 is the SC 08. Accordingly, in the representative SC information storing unit 310, the ID "10000" of the SC 00, and the ID "11000" of the SC 08 are stored as representative SC information.

Setting of the representative SC information in the representative SC information storing unit 310 is made by the system controlling device 301, for example, at startup of the multiprocessor system 300.

The system controlling device 301 makes various types of settings needed for operations, such as an operation for setting an ID in a register or the like included in each unit in addition to the setting of the representative SC information in the representative SC information storing unit 310, of the multiprocessor system 300.

The crossbar XB 00 is a switching device for switching a transmission route according to a destination of data transferred from the SC 00 to 07 or the crossbar XB 1. Similarly, the crossbar XB 01 is a switching device for switching a transmission route of data according to a destination of the data transferred from the SC 08 to 15 or the crossbar XB 00.

In the above described configuration, the unit of arithmetic processing executed within one system board is defined as one node in the multiprocessor system 300. The node is the unit of arithmetic processing when the multiprocessor system executes an arithmetic process.

Accordingly, the multiprocessor system 300 includes the nodes 00 to 15.

The nodes 00 to 07 can communicate with one another via the crossbar XB 00. Similarly, the nodes 08 to 15 can communicate with one another via the crossbar XB 01.

Additionally, the nodes 00 to 07 can communicate with the nodes 08 to 15 one another via the crossbars XB 00 and XB 01. Similarly, the nodes 08 to 15 can communicate with the nodes 00 to 07 one another via the crossbars XB 01 and XB 00.

Operations of the broadcast transfer of the above described multiprocessor system 300 are summarized below. The following (1) to (6) respectively correspond to (1) to (6) illustrated in FIG. 3.

FIG. 3 refers to, as an example, a case where the CPU 00 within the node 00 makes a broadcast transfer. However, a similar process is executed also for a broadcast transfer made by another CPU as a matter of course.

(1) The CPU 00 within the node 00 issues only one request of the broadcast transfer to the SC 00.

The SC 00 obtains representative SC information from the representative SC information storing unit 310 included in the SC 00 upon receipt of the request of the broadcast transfer from the CPU 00 within the local node 00. Then, the SC 00 identifies a representative SC connected to a crossbar other than the crossbar, to which the local node 00 is connected, based on the representative SC information. FIGS. 3 and 4 illustrate a case where the representative SCs are the SC 00 and the SC 08.

(2) The SC 00 transmits the request to the CPUs 01 to 03 other than the CPU 00, which are CPUs within the local node, according to a first destination list 801 to be described later.

(3) The SC 00 transmits the request to the SCs 01 to 07 of the nodes other than the local node, which are SCs subordinate to the crossbar XB 00 to which the local node is connected, according to the first destination list 801 to be described later.

(4) The SC 00 transmits the request to the SC 08 subordinate to the other crossbar XB 01 other than the crossbar XB 00, to which the local node 00 is connected, according to the first destination list 801 to be described later.

Since the SC 08 is a representative SC, the SC 00 transmits, to the SC 08, the request where a broadcast acting bit for requesting the representative SC to act for the broadcast transfer to all the SCs subordinate to the crossbar XB 01 is set. The broadcast acting bit will be described with reference to FIG. 7.

Acting for the broadcast transfer means a process for acting for a broadcast transfer to other nodes subordinate to a routing device, such as a crossbar, to which the local node belongs, by request.

(5) The representative SC 08 transmits the request of the broadcast transfer to the nodes 09 to 15 other than the local node 08, which are SCs subordinate to the crossbar XB 01 to which the local node 08 is connected, upon receipt of the broadcast transfer acting request from the SC 00.

(6) The SCs 01 to 15 respectively issue the request to all the CPUs within the local node upon receipt of the broadcast transfer request from the SC 00 or the representative SC 08.

The multiprocessor system 300 illustrated in FIG. 3 is merely one embodiment. Therefore, the present invention is not limited to the configuration illustrated in FIG. 3.

For example, the number of system boards, the number of SCs, the number of CPUs, and the number of crossbars, and their layouts are not limited in the present invention. If one system board includes a plurality of SCs, one of them may be set as a representative SC.

Additionally, this embodiment refers to the example where each SC includes the representative SC information storing unit 310. However, it is not always needed to make each SC include the representative SC information storing unit 310 as long as the representative SC information storing unit 310 is mounted to be referable.

Furthermore, the above described processes of (2) to (6) do not limit the order of the broadcast transfer process as a matter of course.

FIG. 4 illustrates an outline of a response process to the broadcast transfer illustrated in FIG. 3. The following (1) to (5) respectively correspond to (1) to (5) illustrated in FIG. 4. However, these numbers do not impose limitations on the order of the response process.

(1) The CPU that has received the request from the SC issues a response to the SC that has transmitted the request.

(2) The SCs 09 to 15 transmit responses to the representative SC 08 upon receipt of the responses from all the CPUs within the local node.

(3) The representative SC 08 transmits responses to the SC 00 upon receipt of the responses from all the CPUs within the local node, and the responses from all the SCs 09 to 15.

(4) The SCs 01 to 07 transmit responses to the 00 upon receipt of responses from all the CPUs within the local node.

(5) The SC 00 notifies the CPU 00 that is the requester of the request of the broadcast transfer of all the responses to the request of the broadcast transfer issued by the local SC upon receipt of the responses.

Figure 5:
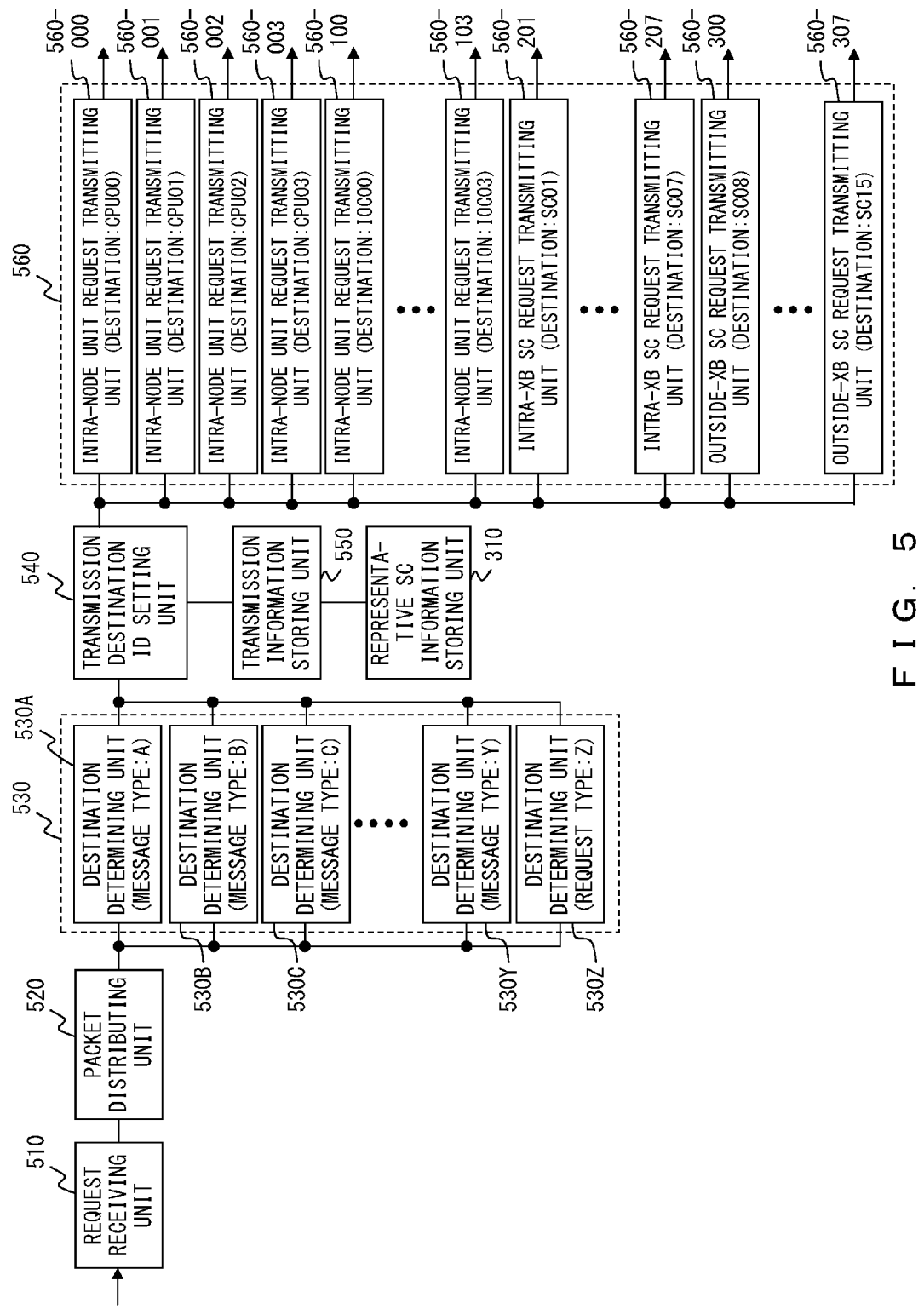
FIG. 5 is an explanatory view of a principal part of an SC 00.
Figure 6:
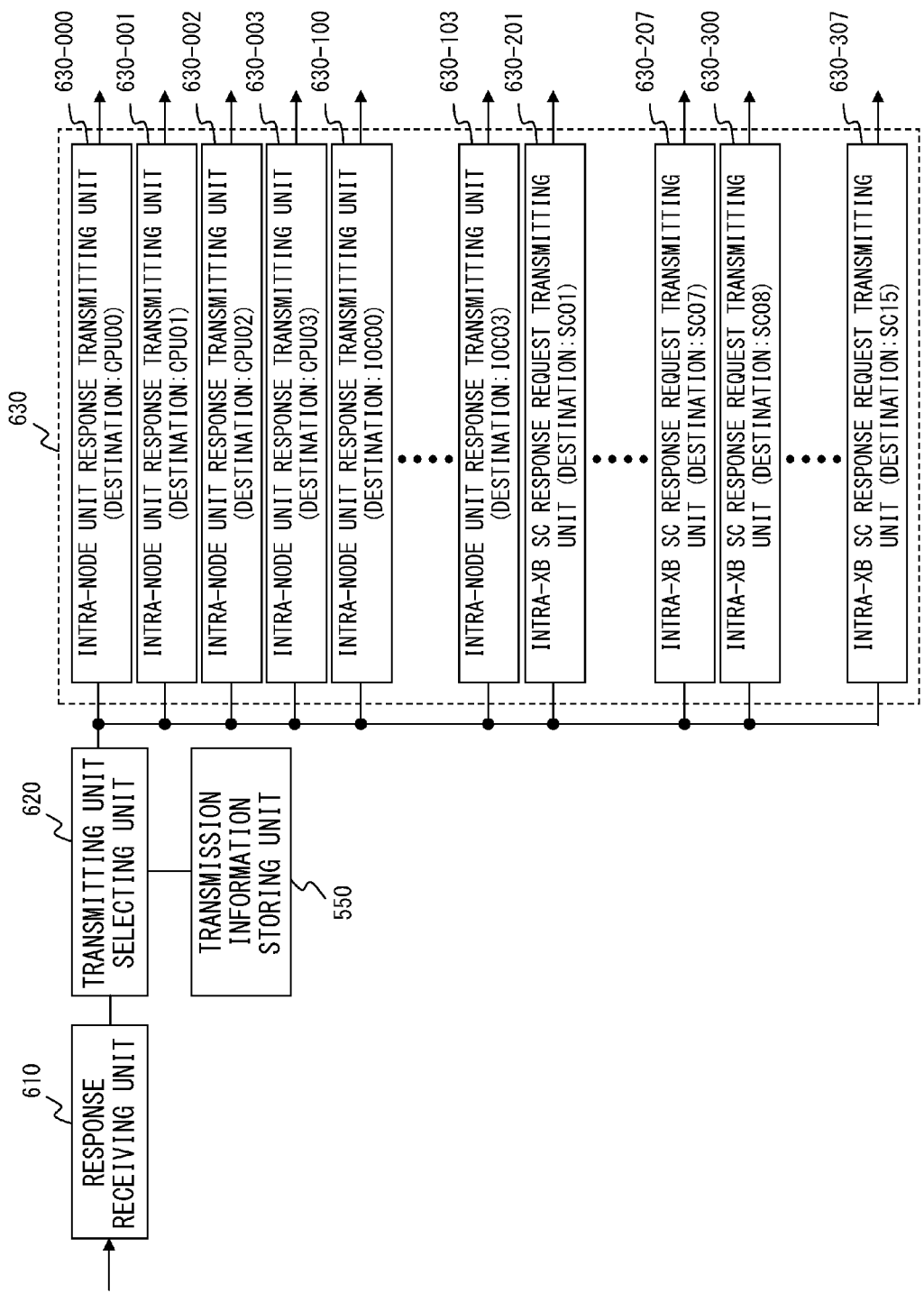
FIG. 6 is an explanatory view of the principal part of the SC 00.

FIGS. 5 and 6 are explanatory views of a principal part of the SC 00. FIG. 5 illustrates an example of a configuration of the principal part of the SC 00, which operates at a request transmission. FIG. 6 illustrates an example of a configuration of the principal part the SC 00, which operates at a response transmission.

As illustrated in FIG. 5, the SC 00 includes a request receiving unit 510, a packet distributing unit 520 to distribute a packet as data, a destination determining unit 530, a transmission destination ID setting unit 540, a transmission information storing unit 550 and a request transmitting unit 560.

The request receiving unit 510 receives a request from the inside/outside of the local node. Then, the request receiving unit 510 transmits the received request to the packet distributing unit 520.

The packet distributing unit 520 distributes the request transmitted by the request receiving unit 510 to any of destination determining units 530A to 530Z according to a message type set in the request. Message types will be described with reference to FIG. 7.

At this time, for example, the packet distributing unit 520 obtains the message type by referencing the request, namely, the packet. Then, the packet distributing unit 520 transmits the request to any of the destination determining units 530A to 530Z according to the message type in the request.

The destination determining unit 530 includes the destination determining units 530A, 530B, 530C, . . . , 530Y and 530Z.

Figure 8:
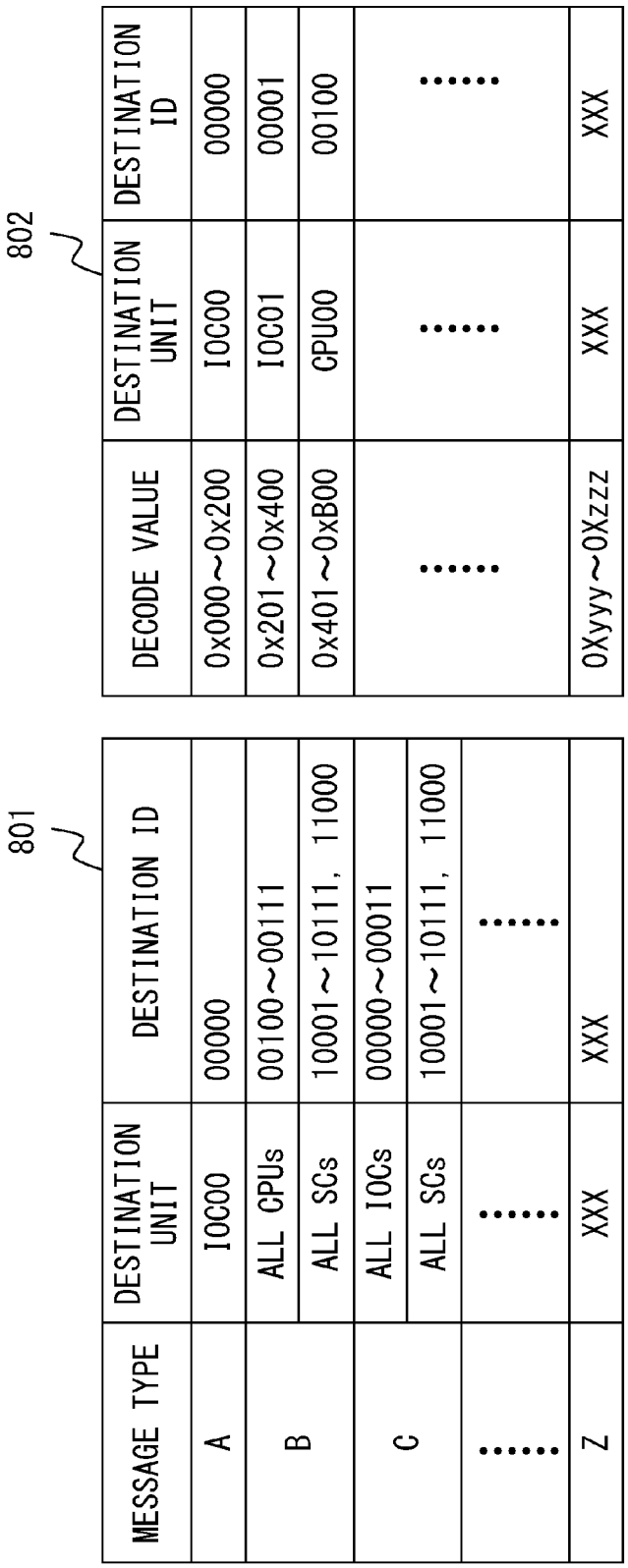
FIG. 8 illustrates examples of structures of destination lists.

The destination determining units 530A, 530B, 530C, . . . , 530Y and 530Z respectively determine destinations of message types A, B, C, . . . , Y and Z based on a destination list illustrated in FIG. 8. Then, the destination determining units 530A, 530B, 530C, . . . , 530Y and 530Z transmit a destination ID of the request along with the request to the transmission destination ID setting unit 540.

For example, the destination determining unit 530A determines that the destination of the request of the message type A is the IOC 00 having a destination ID "00000 (binary number)" based on the first destination list 801 illustrated in FIG. 8. Then, the destination determining unit 530A transmits, to the transmission destination ID setting unit 540, the request and the destination ID "00000 (binary number)" indicating the destination of the request.

The transmission destination ID setting unit 540 sets the destination ID transmitted along with the request in the request transmitted from any of the destination determining units 530A, 530B, 530C, . . . , 530Y and 530Z. Then, the transmission destination ID setting unit 540 transmits the request to a corresponding request transmitting unit that transmits the request to the unit indicated by the destination ID among request transmitting units 560.

For example, if the destination ID is "00000 (binary number)", the transmission destination ID setting unit 540 transmits the request to an intra-node unit request transmitting unit 560-100 that is a request transmitting unit to the destination ID "00000 (binary number)".

The transmission information storing unit 550 is a storing unit to store transmission information for managing a transmission source and a transmission destination of a request. By the transmission destination ID setting unit 540, the transmission information is added, updated, deleted or the like.

The transmission information will be specifically described with reference to FIGS. 11 to 15.

The request transmitting unit 560 includes intra-node unit request transmitting units 560-000 to 560-003, and intra-node unit request transmitting units 560-100 to 560-103.

The intra-node unit request transmitting units 560-000, 560-001, 560-002 and 560-003 respectively transmit the request to the CPU 00, the CPU 01, the CPU 02 and the CPU 03 within the local node.

The intra-node unit request transmitting units 560-100, 560-101, 560-102 and 560-103 respectively transmit a request to the IOC 00, the IOC 01, the IOC 02 and the IOC 03 within the local node.

The request transmitting unit 560 further includes intra-XB SC request transmitting units 560-201 to 560-207, and outside-XB SC request transmitting units 560-301 to 560-307.

The intra-XB SC request transmitting units 560-201, 560-202, . . . , 560-206 and 560-207 respectively transmit a request to the SC 01, the SC 02, . . . , the SC 06 and the SC 07, which are subordinate to the XB 00 to which the local node 00 is connected.

The outside-XB SC request transmitting units 560-300, 560-301, . . . , 560-306 and 560-307 respectively transmit a request to the SC 08, the SC 09, . . . , the SC 14 and the SC 15, which are subordinate to the other XB 01 connected to the XB 00 to which the local node is connected.

Since FIG. 5 illustrates the example of the configuration within the SC 00, a request transmitting unit to transmit the request to the SC 00 itself is omitted. Also in the other SCs 01 to 15, a transmitting unit to transmit the request to the SC itself is omitted.

FIG. 5 illustrates the example of the configuration of the destination determining unit 530 when there are the message types of A to Z. However, the destination determining unit 530 is not limited to the configuration illustrated in FIG. 5 as a matter of course. For example, the number of destination determining units may be, for example, the number of message types.

As illustrated in FIG. 6, the SC 00 further includes a response receiving unit 610, a transmitting unit selecting unit 620 and a response transmitting unit 630.

The response receiving unit 610 receives a response from units inside/outside the local node. Then, the response receiving unit 610 transmits responses received from the units inside/outside the local node to the transmitting unit selecting unit 620.

The transmitting unit selecting unit 620 updates transmission information 1100 about a response stored in the transmission information storing unit 550 upon receipt of the response from the response receiving unit 610. The transmitting unit selecting unit 620 determines whether or not responses have been received from all the units, to which the request has been issued, based on the transmission information 1100. The transmission information 1100 will be specifically described in detail with reference to FIGS. 11 to 15.

The transmitting unit selecting unit 620 transmits responses to the unit at the transmission source of the request upon receipt of the responses from all the units, to which the request has been transmitted.

The response transmitting unit 630 includes intra-node unit response transmitting units 630-000 to 630-003, and intra-node unit response transmitting units 630-100 to 630-103.

The intra-node unit response transmitting units 630-000, 630-001, 630-002 and 630-003 respectively transmit a response to the CPU 00, the CPU 01, the CPU 02 and the CPU 03 within the local node.

The intra-node unit response transmitting units 630-100, 630-101, 630-102 and 630-103 respectively transmit a response to the IOC 00, the IOC 01, the IOC 02 and the IOC 03 within the local node.

The response transmitting unit 630 further includes intra-XB SC response transmitting units 630-201 to 630-207, and outside-XB SC response transmitting units 630-301 to 630-307.

The intra-XB SC response transmitting units 630-201, 630-202, . . . , 630-206 and 630-207 respectively transmit a response to the SC 01, the SC 02, . . . , the SC06 and the SC 07, which are subordinate to an XB to which the local node is connected.

The outside-XB SC response transmitting units 630-300, 630-301, . . . , 630-306 and 630-307 respectively transmit a response to the SC 08, the SC 09, . . . , the SC 14 and the SC 15 within an XB connected to the XB to which the local node is connected.

Figure 7:
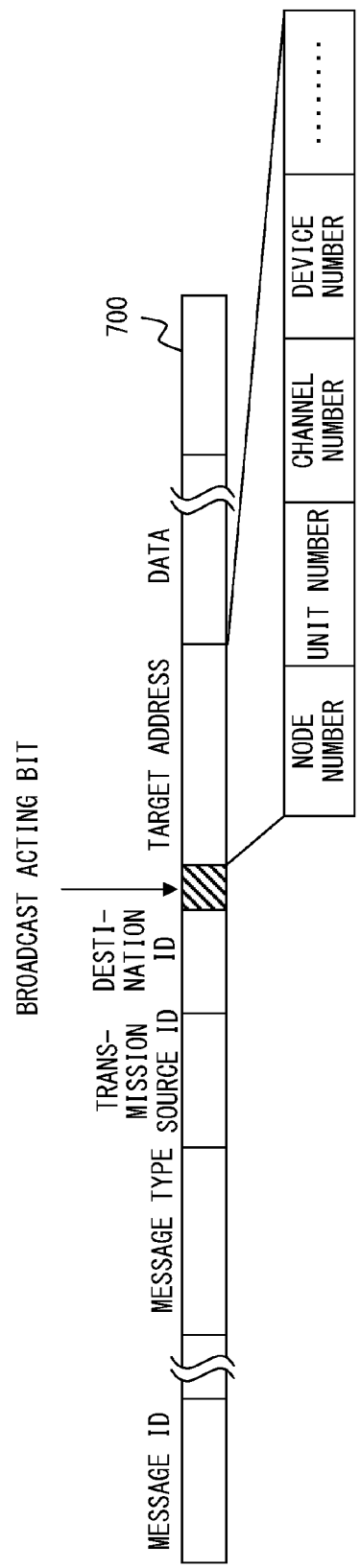
FIG. 7 illustrates a principal part of a packet used for a request, or for a response to the request.

FIG. 7 illustrates a principal part of a packet used for a request, or for a response to the request.

The packet 700 illustrated in FIG. 7 is information including a message ID, a message type, a transmission source ID, a destination ID, a broadcast acting bit, a target address and needed data.

The message ID is identification information for identifying the packet 700.

The message type is information indicating a type of content of the packet 700, for example, a snoop request or the like.

The transmission source ID is an ID indicating a unit at a transmission source of the packet 700.

The destination ID is an ID indicating a unit at a transmission destination of the packet 700.

The broadcast acting bit is information indicating whether or not to act for a broadcast transfer. To issue a request to act for a broadcast transfer to a representative SC, an SC sets the broadcast acting bit to "1".

Additionally, upon receipt of a request where the broadcast acting bit is set to "1", the representative SC makes a broadcast transfer to the other SCs subordinate to the crossbar to which the local node is connected.

The target address is information about an address assigned to a unit to which a packet is to be transmitted. The address information is identification information including, for example, a node number, a unit number, a channel number, a device number and the like of a destination unit.

The final destination of the packet 700 can be obtained based on the message type, a destination list to be described later, and the target address if necessary.

FIG. 8 illustrates examples of structures of destination lists. In this embodiment, two destination lists such as a first destination list and a second destination list are used as occasion demands.

The first destination list 801 defines an association between a message type and a destination ID determined according to the message type.

The second destination list 802 defines an association between a decode value obtained from a target address and a destination ID determined according to the decode value.

Each decode value of the second destination list 802 is a value obtained by decoding a value composed of a node number and a unit number of the target address illustrated in FIG. 7.

In the first destination list 801 and the second destination list 802, which are illustrated in FIG. 8, units respectively indicated by destination IDs are represented as destination units for ease of understanding. However, information of the destination units is not essential information.

FIG. 9 is an explanatory view of a process executed by the destination determining unit 530. (1) and (2), illustrated in FIG. 9, respectively correspond to the following (1) and (2).

(1) The destination determining unit 530 obtains data from an area where the message type of the packet 700 received from the packet distributing unit 520 is stored. Next, the destination determining unit 530 decodes the data obtained from the packet 700.

Then, the destination determining unit 530 references message type definition information 901 that defines a message type for each decode value. The destination determining unit 530 then identifies the message type corresponding to the decode value.

Next, the destination determining unit 530 references the first destination list 801. The destination determining unit 530 obtains, from the first destination list 801, the destination ID corresponding to the message type.

(2) If the destination ID is not identified only with the message type, the destination determining unit 530 obtains data from an area where a node number and a unit number are stored based on a target address of the packet 700. Next, the destination determining unit 530 decodes the data obtained from the target address.

Then, the destination determining unit 530 references the second destination list 802. The destination determining unit 530 obtains, from the second destination list 802, the destination ID corresponding to the decode value.

Whether or not to be able to identify a destination only with a message type may be predetermined, by way of example, according to each message type.

Figure 10:
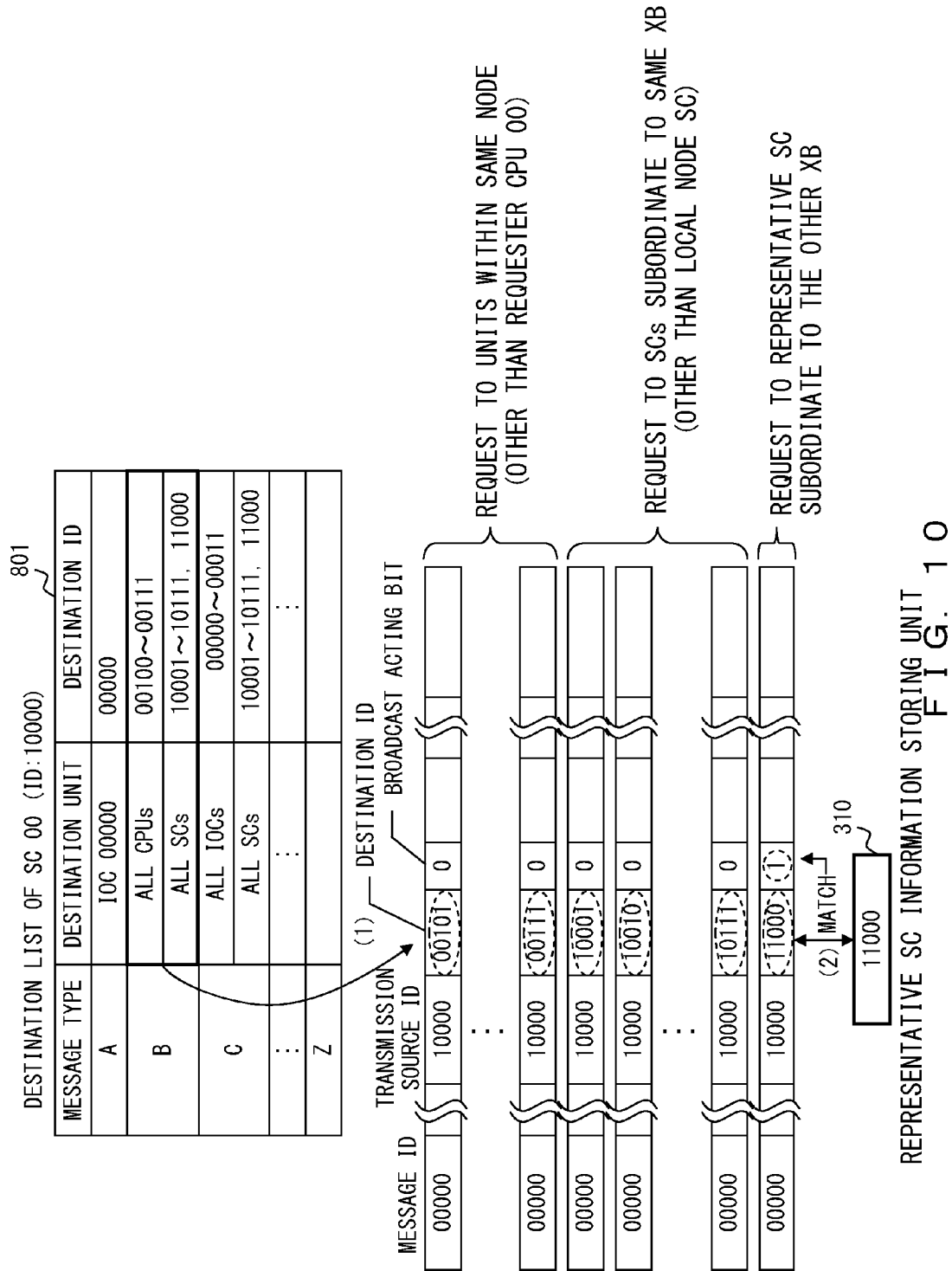
FIG. 10 is an explanatory view of a destination ID setting process executed by a transmission destination ID setting unit 540.

FIG. 10 is an explanatory view of a destination ID setting process executed by the transmission destination ID setting unit 540. (1) and (2), illustrated in FIG. 10, respectively correspond to the following (1) and (2). As needed, a request received from another unit is referred to as an arrival request, whereas a request transmitted to another unit is referred to as a transmission request.

Upon receipt of a request from the destination determining unit 530, the transmission destination ID setting unit 540 generates a request where a destination ID notified from the destination determining unit 530 along with the request is set.

For example, a case where a message type of a request from the CPU 00 is a message type B is considered. In this case, the destination determining unit 530B to determine the destination of the message type B obtains, from the first destination list 801, a destination ID of the request of the message type B.

Then, the destination determining unit 530B notifies the transmission destination ID setting unit 540 of the obtained destination ID.

(1) Then, the transmission destination ID setting unit 540 generates a transmission request, which is to be transmitted to all the CPUs within the local node 00, all the SCs subordinate to the same crossbar XB 00, and a representative SC 08 subordinate to the other crossbar XB 01, and which has the same data content as an arrival request.

However, since the CPU 00 is a requester and the SC 00 is an SC of the local node, a transmission request to the CPU 00 and the SC 00 is not generated.

Then, the transmission destination ID setting unit 540 sets destination IDs "00101" to "00111", "10001" to "10111", and "11000", which are notified from the destination determining unit 530B, in the generated transmission request.

(2) Additionally, the transmission destination ID setting unit 540 references the representative SC information storing unit 310. If the destination ID matches the ID "11000" set in the representative SC information storing unit 310, the transmission destination ID setting unit 540 sets the broadcast acting bit of the transmission request to "1".

FIGS. 11 to 15 are explanatory views of the transmission information 1100 stored in the transmission information storing unit 550.

The transmission information 1100 is information including a new message ID, a valid flag, an old message ID, an old transmission source ID, a transmission destination list, a response waiting list, BC (BroadCast) response content, and a request type.

Figure 11:
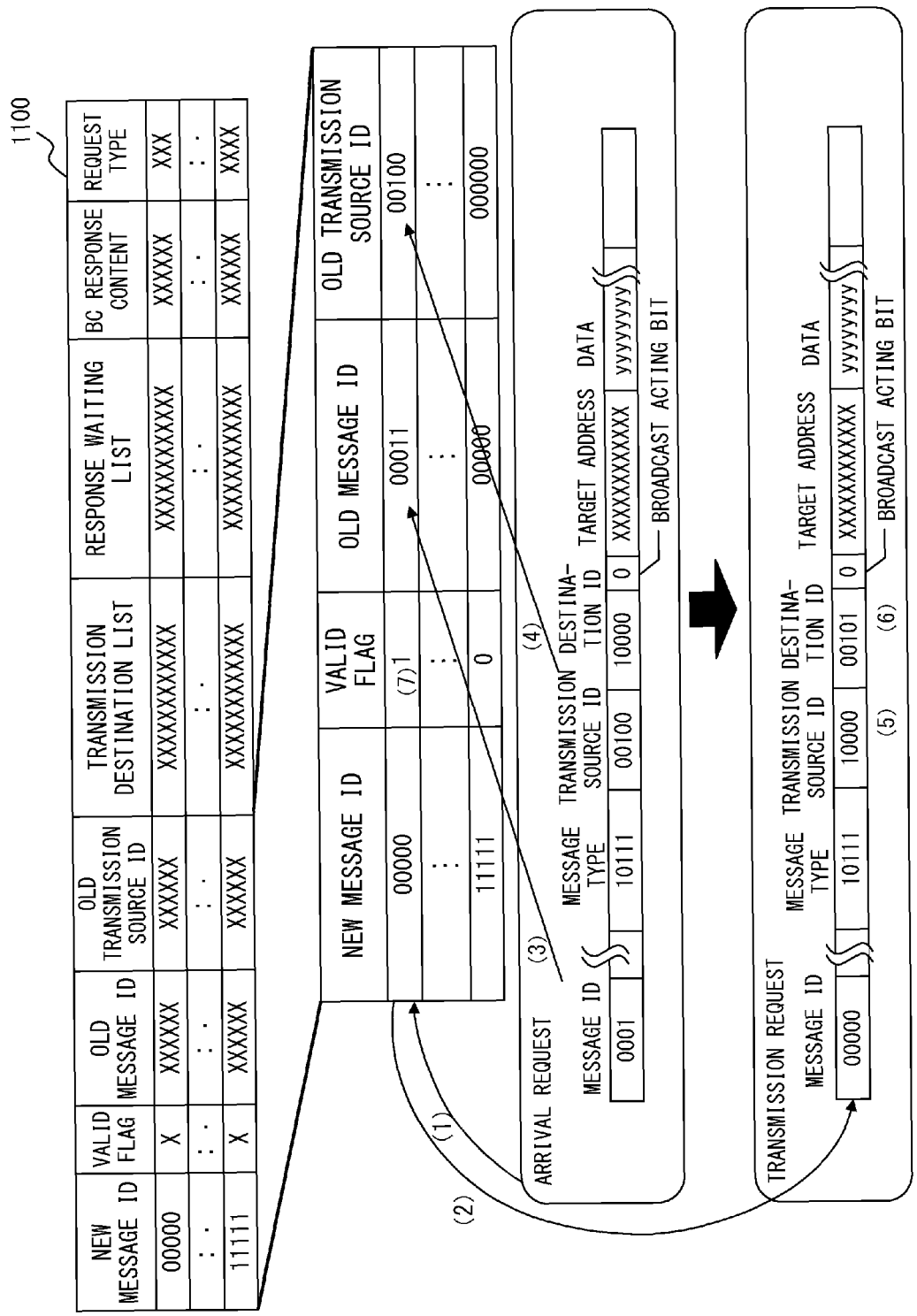
FIG. 11 is an explanatory view of transmission information 1100 stored in a transmission information storing unit 550.

FIG. 11 is an explanatory view of the new message ID, the valid flag, the old message ID and the old transmission source ID of the transmission information 1100.

The new message ID is an identification number assigned to a transmission request. FIG. 11 illustrates an example of a case where values from 00000 (binary number) to 11111 (binary number) are used.

The valid flag is information for identifying whether or not a new message ID is valid. If the valid flag is "1", the new message ID is valid, namely, in use. Alternatively, if the valid flag is "0", the new message is invalid, namely, unused.

The old message ID is a message ID obtained from an arrival request. Moreover, the old transmission source ID is a transmission source ID obtained from the arrival request.

The new message ID, the valid flag, the old message ID and the old transmission source ID are used as follows. (1) to (7), illustrated in FIG. 11, respectively correspond to the following (1) to (7).

(1) Upon receipt of an arrival request, the transmission destination ID setting unit 540 decides a new message ID to be assigned to the arrival request from among new message IDs where the valid flag is set to "0" by using a priority circuit or the like.

For example, a new message ID that is least frequently used in recent days may be assigned to the arrival request from among the new message IDs where the valid flag is set to "0" by using a priority circuit of an LRU (Least Recently Used) method.

FIG. 11 illustrates the transmission information 1100 used when the new message ID "00000" is assigned to the arrival request.

(2) When deciding the new message ID assigned to the arrival request, the transmission destination ID setting unit 540 sets the decided new message ID in a transmission request.

(3) Additionally, the transmission destination ID setting unit 540 obtains the message ID from the arrival request. Then, the transmission destination ID setting unit 540 stores the obtained message ID as the old message ID of the transmission information.

(4) Similarly, the transmission destination ID setting unit 540 obtains a transmission source ID from the arrival request. Then, the transmission destination ID setting unit 540 stores the obtained transmission source ID as the old transmission source ID of the transmission information.

(5) The transmission destination ID setting unit 540 sets the ID "10000" of the SC 00 itself as the transmission source ID of the transmission request.

(6) The transmission destination ID setting unit 540 sets the destination ID notified from the destination determining unit 530 as the destination ID of the transmission request. This point is as described with reference to FIG. 10.

(7) Upon completion of setting the transmission request, a transmission waiting list and the like, which will be described later, the transmission destination ID setting unit 540 sets the valid flag to "1". Then, the transmission destination ID setting unit 540 transmits the transmission request to the request transmitting unit 560.

Note that the above described (1) to (7) are intended to clarify associations with FIG. 11, and do not represent the order of process of the transmission destination ID setting unit 540.

FIG. 12 is an explanatory view of the transmission destination list and the transmission waiting list in the transmission information 1100.

The transmission waiting list includes information for managing whether or not a request has been transmitted to the CPU 0, the CPU 1, the CPU 2 and the CPU 3 within a local node, and information for managing whether or not the request has been transmitted to the SC of the node 0, the SC of the node 1, ..., the SC of the node 14 and the SC of the node 15.

The information for managing whether or not the request has been transmitted is referred to as "transmission management information". This transmission management information is data having a 1-bit width.

For example, if the transmission management information of the CPU 0 within the local node is "1", this indicates a state where a request has been transmitted to the CPU 0 within the local node and a response is waited. If the transmission management information of the CPU 0 within the local node is "0", this indicates a state where the request has not been transmitted to the CPU 0 within the local node or a response to the transmitted request has been received.

The transmission waiting list includes information indicating that a request waits to be transmitted to the CPU 0, the CPU 1, the CPU 2 and the CPU 3 within the local node, and information indicating that a request to the SC of the node 0, the SC of the node 1, ..., the SC of the node 14 and the SC of the node 15 waits to be transmitted.

The information indicating whether or not the request waits to be transmitted is referred to as "transmission waiting information". This transmission waiting information is data having a 1-bit width.

For example, if the transmission waiting information of the CPU 0 within the local node is "1", this indicates that the request to the CPU 0 within the local node waits to be transmitted. If the transmission waiting information of the CPU 0 within the local node is "0", the request does not wait to be transmitted to the CPU 0 within the local node.

The transmission destination list and the transmission waiting list are used as follows.

(1) Upon receipt of an arrival request, the transmission destination ID setting unit 540 sets, to "1", the transmission management information and the transmission waiting information of a unit indicated by a notified destination ID according to the destination ID notified from the destination determining unit 530.

For example, for the request of the broadcast transfer from the CPU 00 to all the CPUs, the destination IDs "00101" to "00111", "10001" to "10111" and "11000" are notified from the destination determining unit 530 as illustrated in FIG. 10.

Then, the transmission destination ID setting unit 540 sets, to "1", the transmission management information and the transmission waiting information of the units indicated by the destination IDs "00101" to "00111", "10001" to "10111" and "11000".

(2) After transmitting the request via the request transmitting unit 560, the transmission destination ID setting unit 540 sets, to "0", the transmission waiting information of the unit to which the request has been transmitted.

(3) Upon receipt of a response from the unit to which the request has been transmitted, the transmitting unit selecting unit 620 sets, to "0", the transmission management information of the unit that has transmitted the received response.

(4) The transmitting unit selecting unit 620 transmits the response to the unit indicated by the old transmission source ID of the transmission information 1100 when all pieces of the transmission management information of the transmission destination list and all pieces of the transmission waiting information of the transmission waiting list have been set to "0". At this time, the transmitting unit selecting unit 620 sets, to "0", the valid flag of the transmission information 1100.

Figure 13:
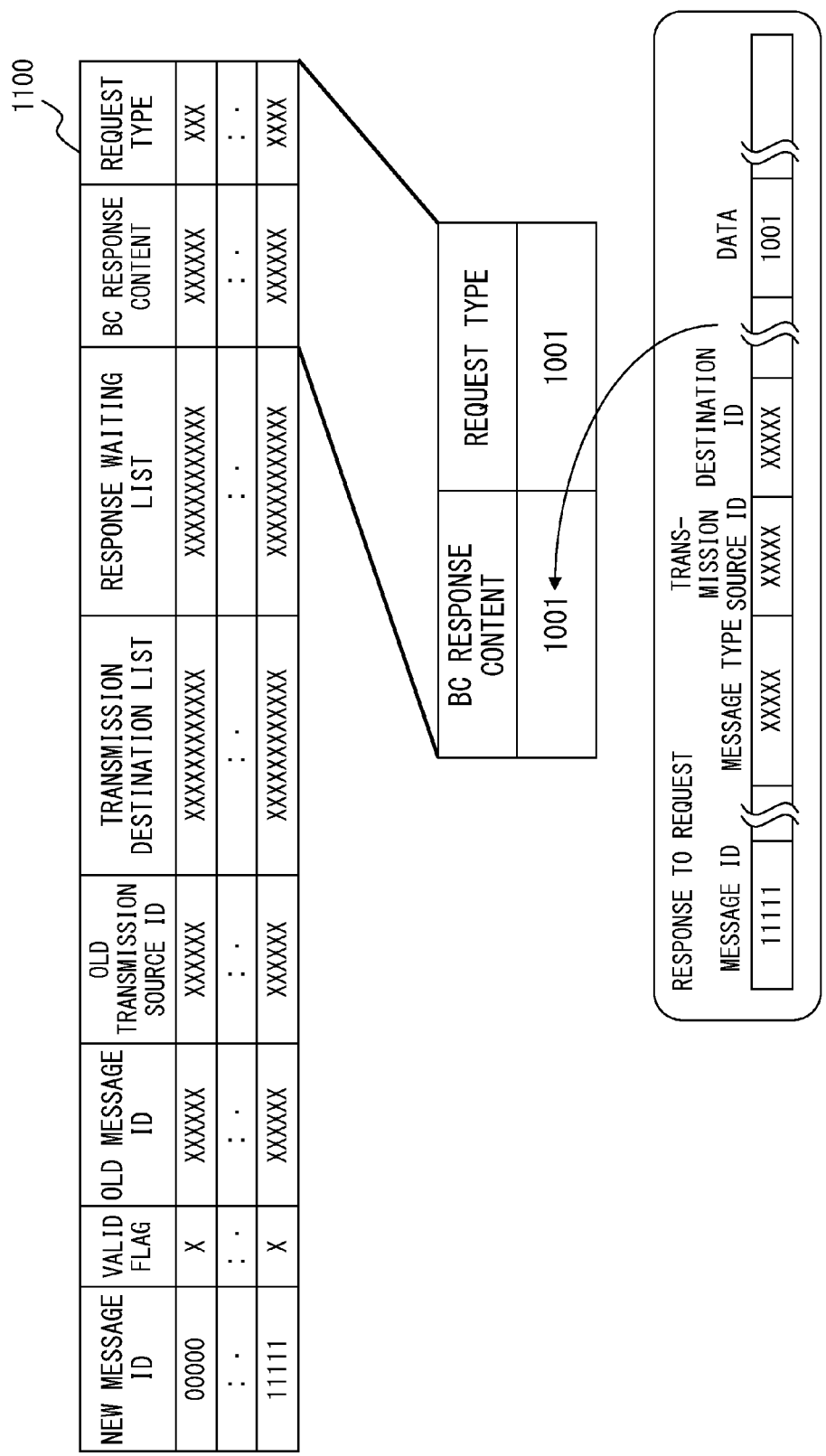
FIG. 13 is an explanatory view of the transmission information 1100 stored in the transmission information storing unit 550.

FIG. 13 is an explanatory view of BC response content, and a request type in the transmission information 1100.

The BC response content is a response having the highest priority decided by priority decision information indicated by the request type among responses respectively transmitted from the units.

For a broadcast-transferred request, a response having different content is sometimes transmitted from the units depending on a request. In such a case, a response having the highest priority among responses respectively transmitted from the units is stored as the "BC response content".

The request type is identification information for identifying the priority decision information for deciding priorities.

The transmitting unit selecting unit 620 references the priority decision information indicated by a request type upon receipt of a response to the request. Then, the transmitting unit selecting unit 620 makes a comparison between the priority of response content stored in the BC response content and that of response content of the received response, and stores the response content having the higher priority in the BC response content of the transmission information 1100.

FIG. 14 illustrates a specific example of the priority decision information.

Priority decision information 1401 is priority decision information for deciding priorities of responses to a power control request. The priority decision information 1401 is a table where a priority is associated with response content.

Priority decision information 1402 is priority decision information for deciding priorities of responses to a snoop request. The priority decision information 1402 is a table where a priority is associated with response content.

Note that the priority decision information illustrated in FIG. 14 are merely examples, and the priority decision information is not limited to those illustrated in FIG. 14.

Figure 15:
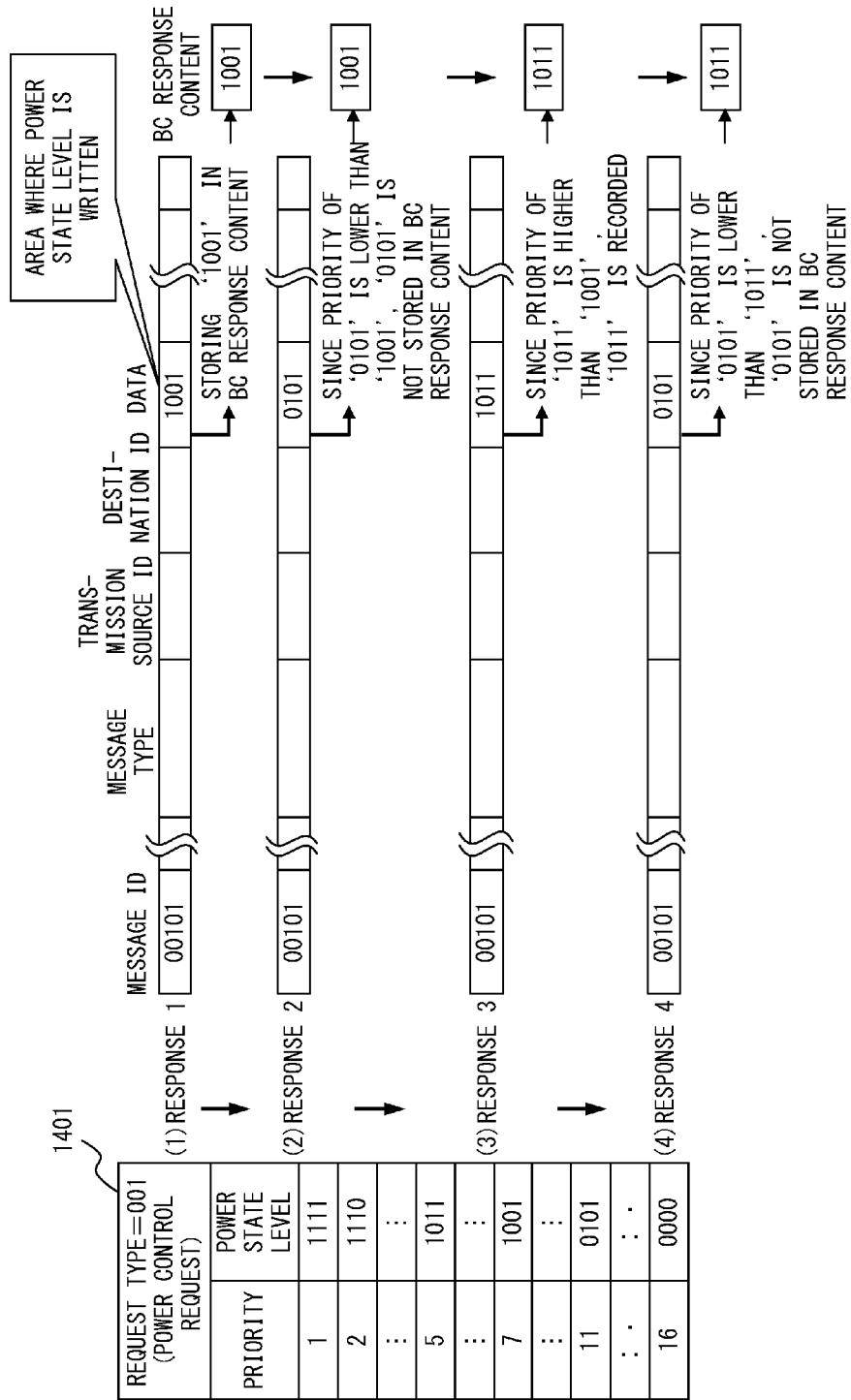
FIG. 15 is an explanatory view of the transmission information 1100 stored in the transmission information storing unit 550.

FIG. 15 is an explanatory view of a usage example of the priority decision information.

FIG. 15 explains the usage example of the priority decision information 1401 for deciding priorities of responses to the power control request illustrated in FIG. 14. A process executed when responses to the message ID "00101" are received from four units is described for ease of explanation.

(1) to (4), illustrated in FIG. 15, respectively correspond to the following (1) to (4).

(1) Upon receipt of a response 1 that is the initial response to the power control request, the transmitting unit selecting unit 620 obtains response content "1001" from a data area of the response 1.

Then, the transmitting unit selecting unit 620 references the transmission information 1100, and stores the response content "1001" obtained from the response 1 in the BC response content to which the same new message ID as the message ID "00101" of the response content 1 is assigned.

(2) Upon receipt of a response 2 next to the response 1, the transmitting unit selecting unit 620 obtains response content "0101" from a data area of the response 2.

Then, the transmitting unit selecting unit 620 references the priority decision information 1401, and identifies the priority of the response content "0101" obtained from the response 2. Similarly, the transmitting unit selecting unit 620 identifies the priority of the response content "1001" stored in the BC response content. Then, the transmitting unit selecting unit 620 makes a comparison between the two identified priorities.

The priority "11" of the response content "0101" obtained from the response 2 is lower than the priority "7" of the response content "1001" stored in the BC response content. In this case, the transmitting unit selecting unit 620 holds the response content "1001" stored in the BC response content.

(3) Upon receipt of a response 3 next to the response 2, the transmitting unit selecting unit 620 obtains response content "1011" from a data area of the response 3.

Then, the transmitting unit selecting unit 620 references the priority decision information 1401, and identifies the priority of the response content "1011" obtained from the response 3. Similarly, the transmitting unit selecting unit 620 identifies the priority of the response content "1001" stored in the BC response content. Then, the transmitting unit selecting unit 620 makes a comparison between the two identified priorities.

The priority "5" of the response content "1011" obtained from the response 3 is higher than the priority "7" of the response content "1001" stored in the BC response content. In this case, the transmitting unit selecting unit 620 updates the response content stored in the BC response content to "1011".

(4) Upon receipt of a response 4 next to the response 3, the transmitting unit selecting unit 620 obtains the response content "0101" from a data area of the response 4.

Then, the transmitting unit selecting unit 620 references the priority decision information 1401, and identifies the priority of the response content "0101". Similarly, the transmitting unit selecting unit 620 identifies the priority of the response content "1011" stored in the BC response content. Then, the transmitting unit selecting unit 620 makes a comparison between the two identified priorities.

The priority "11" of the response content "0101" obtained from the response 4 is lower than the priority "5" of the response content "1011" stored in the BC response content. In this case, the transmitting unit selecting unit 620 holds the response content "1011" stored in the BC response content.

Figure 16:
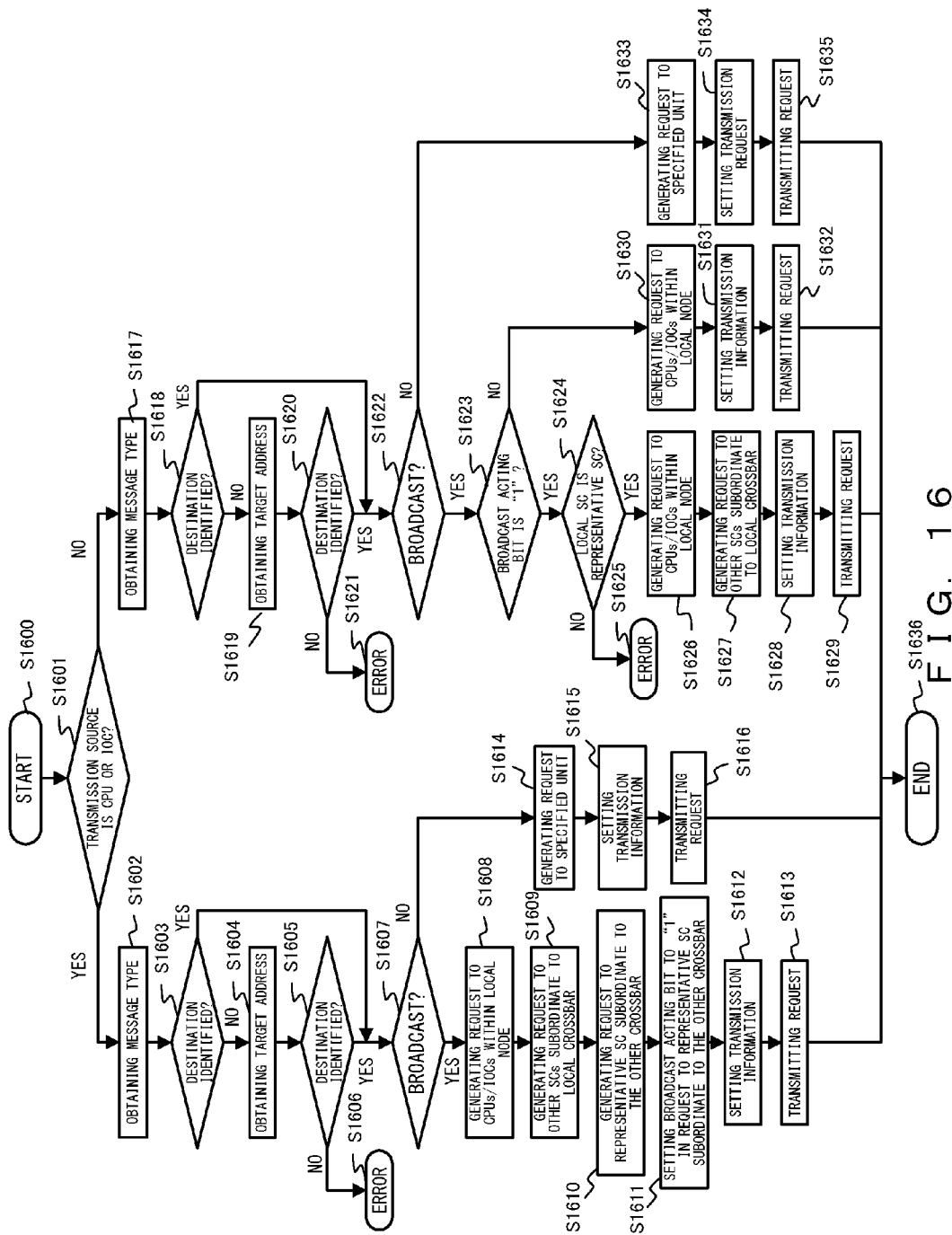
FIG. 16 is a flowchart illustrating a request transmission process executed by an SC.

FIG. 16 is a flowchart illustrating a request transmission process executed by an SC.

Upon receipt of a request by the request receiving unit 510, the SC starts the transmission process of the received request (step S1600).

In step S1601, the packet distributing unit 520 references a transmission source ID set in the request. Then, the packet distributing unit 520 determines whether the transmission source of the request is either a CPU or an IOC.

If the packet distributing unit 520 determines that the transmission source of the request is either the CPU or the IOC, namely, if the transmission source is a unit within the local node, the flow goes to step S1602 ("YES" in step S1601). Alternatively, if the packet distributing unit 520 determines that the transmission source of the request is neither the CPU nor the IOC, namely, if the transmission source is not a unit within the local node, the flow goes to step S1617 ("NO" in step S1601).

In step S1602, the packet distributing unit 520 obtains, from the request, a message type set in the request. Then, the packet distributing unit 520 distributes the message to any of the destination determining units 530A to 530Z within the destination determining unit 530 according to the message type.

In step S1603, if the destination determining unit 530 determines that a destination is not identified only according to the message type obtained in step S1602, the flow goes to step S1604 ("NO" in step S1603).

Alternatively, if determining that the destination is identified according to the message type obtained in step S1602, the destination determining unit 530 obtains a destination ID according to the message type from the first destination list 801. Then, the flow goes to step S1607 ("YES" in step S1603).

In step S1604, the destination determining unit 530 obtains, from the request, part of a target address, namely, a node number and a unit number set in the request. Then, the destination determining unit 530 obtains, from the second destination list 802, a destination ID according to a value obtained by decoding the node number and the unit number.

In step S1605, if the destination determining unit 530 does not properly obtain the destination ID despite executing the processes in steps S1602 to S1604, the flow goes to step S1606 ("NO" in step S1605). In this case, the SC anomalously terminates the transmission process of the request.

Alternatively, if the destination determining unit 530 properly obtains the destination ID, the flow goes to step S1607 ("YES" in step S1605).

In step S1607, the transmission destination ID setting unit 540 determines whether or not the request is a request of a broadcast transfer. For example, information indicating whether or not the request is the request of the broadcast transfer may be preset for each message type, and whether or not the request is the request of the broadcast transfer may be determined based on the set information.

If the request is the request of the broadcast transfer, the flow goes to step S1608 ("YES" in step S1607). Alternatively, if the transmission destination ID setting unit 540 determines that the request is not the request of the broadcast transfer, the flow goes to step S1614 ("NO" in step S1607).

In step S1608, the transmission destination ID setting unit 540 generates a request to CPUs or IOCs within the local node.

In step S1609, the transmission destination ID setting unit 540 generates a request to SCs other than the local node, namely, other SCs subordinate to the crossbar to which the local node is connected, namely, the local crossbar.

In step S1610, the transmission destination ID setting unit 540 generates a request to a representative SC subordinate to a crossbar other than the crossbar to which the local node is connected, namely, the other crossbar.

The specific processes of steps S1608 to S1610 are illustrated in FIGS. 10 and 11.

In step S1611, the transmission destination ID setting unit 540 sets, to "1", the broadcast acting bit of the request generated in step S1610.

In step S1612, the transmission destination ID setting unit 540 sets the transmission information 1100 for the request generated with steps S1608 to S1610. For the settings of the transmission information 1100, the specific processes are illustrated in FIGS. 11 and 12

The transmission destination ID setting unit 540 transmits the request to any of the request transmitting units 560-000 to 560-003, 560-100 to 560-103, 560-201 to 560-207, and 560-301 to 560-307 according to destination IDs set in the request.

In step S1613, upon receipt of the request from the transmission destination ID setting unit 540, the request transmitting unit 560 transmits the request to predetermined units.

In contrast, the transmission destination ID setting unit 540 generates a request to the unit identified with the processes of steps S1602 to S1605. The specific process of step S1614 is illustrated in FIGS. 10 and 11.

Processes in steps S1615 to S1616 are similar to those of steps S1612 to S1613.

Processes in steps S1617 to S1622 are similar to those of steps S1602 to S1607.

In step S1622, if the transmission destination ID setting unit 540 determines that the request is the request of the broadcast transfer, the flow goes to step S1623 ("YES" in step S1622). Alternatively, if the transmission destination ID setting unit 540 determines that the request is not the request of the broadcast transfer, the flow goes to step S1633 ("NO" in step S1622).

In step S1623, the transmission destination ID setting unit 540 references the broadcast acting bit of the request. Then, the transmission destination ID setting unit 540 determines whether or not the broadcast acting bit is "1".

If the transmission destination ID setting unit 540 determines that the broadcast acting bit is "1", the flow goes to step S1624 ("YES" in step S1623). Alternatively, if the transmission destination ID setting unit 540 determines that the broadcast acting bit is "0", the flow goes to step S1630 ("NO" in step S1623).

In step S1624, the transmission destination ID setting unit 540 determines whether or not the local SC is a representative SC.

For example, the transmission destination ID setting unit 540 references the representative SC information storing unit 310 included in the local SC. Then, the transmission destination ID setting unit 540 determines whether or not an ID of the local SC is registered to the representative SC information storing unit 310.

If the ID of the local SC is not registered to the representative SC information storing unit 310, the transmission destination ID setting unit 540 determines that the local SC is not the representative SC, and the flow goes to step S1625 ("NO" in step S1624). In this case, the SC anomalously terminates the transmission process of the request.

If the ID of the local SC is registered to the representative SC information storing unit 310, the transmission destination ID setting unit 540 determines that the local SC is the representative SC, and the flow goes to step S1626 ("YES" in step S1624).

In step S1626, the transmission destination ID setting unit 540 generates a request to CPUs or IOCs within the local node.

In step S1627, the transmission destination ID setting unit 540 generates a request to SCs other than the local node, namely, other SCs subordinate to the crossbar to which the local node is connected, namely, the local crossbar.

Processes in steps S1628 to S1629 are similar to those of steps S1612 to S1613.

In the meantime, in step S1630, the transmission destination ID setting unit 540 generates a request to CPUs or IOCs within the local node.

Processes in steps S1631 to S1632 are similar to those of steps S1612 to S1613. Moreover, processes in steps S1633 to S1635 are similar to those of steps S1614 to S1616.

Upon termination of the above described processes, the flow goes to step S1636. Then, the SC terminates the transmission process of the request.

Figure 17:
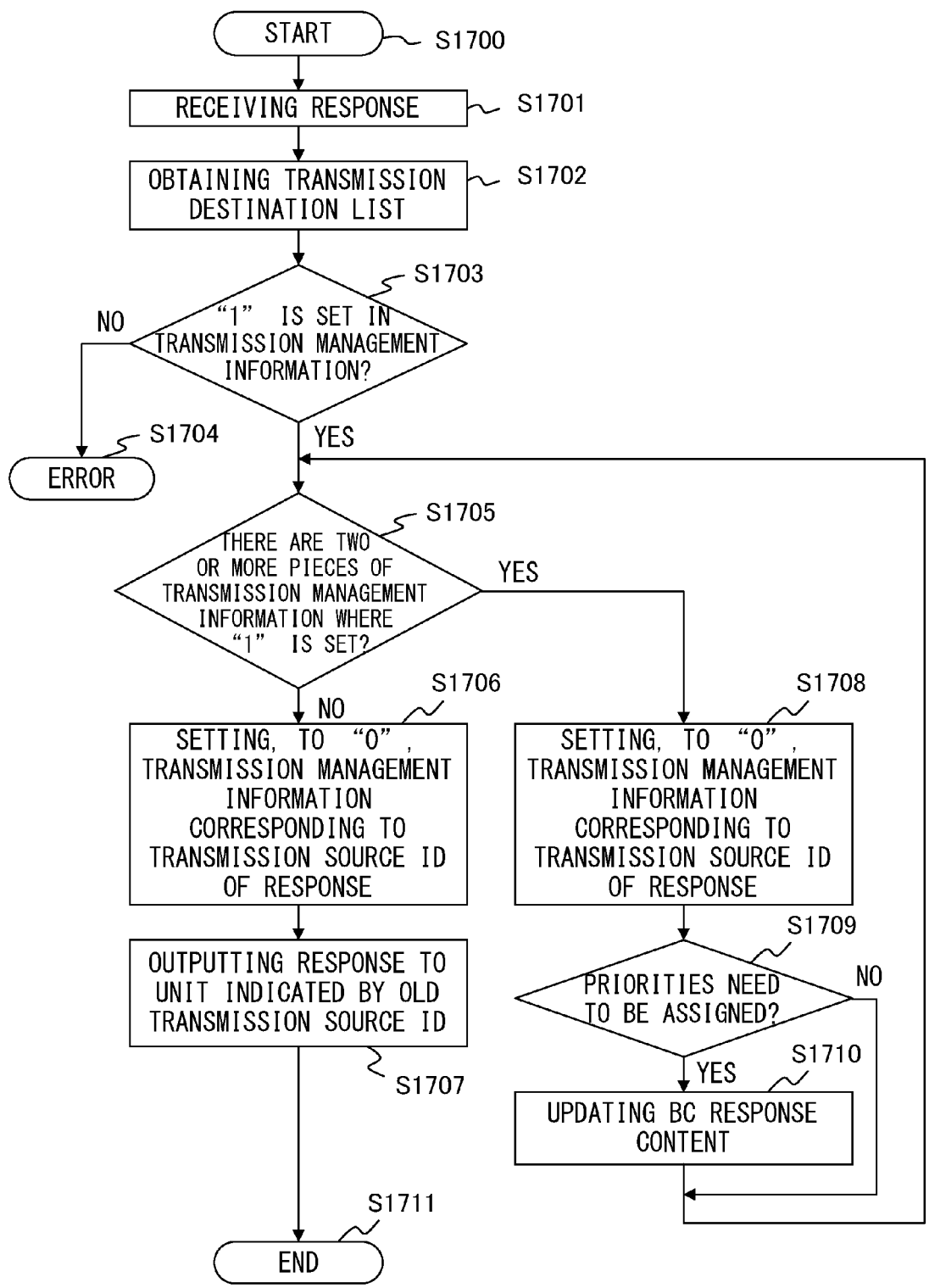
FIG. 17 is a flowchart illustrating a response process executed by an SC.

FIG. 17 is a flowchart illustrating a response process executed by an SC.

In step S1701, upon receipt of a response from a unit inside/outside the local node, the response receiving unit 610 transmits the received response to the transmitting unit selecting unit 620.

In step S1702, the transmitting unit selecting unit 620 obtains a message ID from the received response. Then, the transmitting unit selecting unit 620 obtains a transmission destination list of the obtained message ID from the transmission information storing unit 550. For the transmission destination list, its specific example is illustrated in FIG. 12.

In step S1703, the transmitting unit selecting unit 620 determines whether or not "1" is set in the transmission management information of the obtained transmission destination list.

If the transmitting unit selecting unit 620 determines that "1" is not set in the transmission management information of the obtained transmission destination list, the flow goes to step S1704 ("NO" in step S1703). In this case, the anomalously terminates the process.

Alternatively, if the transmitting unit selecting unit 620 determines that "1" is set in the transmission management information of the obtained transmission destination list, the flow goes to step S1705 ("YES" in step S1703).

In step S1705, the transmitting unit selecting unit 620 determines whether or not there are two or more pieces of the transmission management information where "1" is set.

If the transmitting unit selecting unit 620 determines that there are no two or more pieces of the transmission management information where "1" is set, the flow goes to step S1706 ("NO" in step S1705). Alternatively, if the transmitting unit selecting unit 620 determines that there are two or more pieces of the transmission management information where "1" is set, the flow goes to step S1708 ("YES" in step S1705).

In step S1706, the transmitting unit selecting unit 620 obtains a transmission source ID from the received response. Then, the transmitting unit selecting unit 620 sets, to "0", the transmission management information corresponding to the transmission source ID.

In step S1707, the transmitting unit selecting unit 620 obtains an old message ID, an old transmission source ID, and BC response content if necessary from the transmission list corresponding to the message ID obtained from the response in step S1702.

Then, the transmitting unit selecting unit 620 generates a response by respectively setting the old message ID, the old transmission source ID and the BC response content, which are obtained from the transmission list, as a message ID, a destination ID and data of the response.

The transmitting unit selecting unit 620 transmits the response to the response transmitting units 630-000 to 630-

003, 630-100 to 630-103, 630-201 to 630-207, and 630-301 to 630-307, which correspond to the destination IDs set in the response.

Then, the response transmitting unit 630 transmits the received response to predetermined units.

In the meantime, in step S1708, the transmitting unit selecting unit 620 obtains a transmission source ID from the received response. Then, the transmitting unit selecting unit 620 sets the transmission management information corresponding to the transmission source ID to "0".

In step S1709, the transmitting unit selecting unit 620 determines whether or not to assign a priority to the response content of the received response. Whether or not to assign a priority to the response content may be preset according to a message type of a response.

If the transmitting unit selecting unit 620 determines to assign a priority to the response content, the flow goes to step S1710 ("YES" in step S1709). Alternatively, if the transmitting unit selecting unit 620 determines not to assign a priority to the response content, the flow goes to step S1705 ("NO" in step S1709).

In step S1710, if the priority of the response content obtained from the received response is higher than the priority of the response content stored in the BC response content in the transmission information 1100 corresponding to the message ID of the response, the transmitting unit selecting unit 620 updates the BC response content to the response content obtained from the response. Then, the flow goes to step S1705.

As described above, the multiprocessor system 300 includes the representative SCs respectively for the crossbars XB 00 and XB 01.

Upon receipt of the broadcast transfer request from a unit, such as a CPU or an IOC, within a local node, an SC makes a broadcast transfer to units subordinate to a crossbar to which the local node is connected.

Additionally, the SC requests a representative SC subordinate to a crossbar other than the crossbar, to which the local node is connected, to act for the broadcast transfer. Then, the SC that has been requested to act for the broadcast transfer makes the broadcast transfer to units subordinate to the crossbar to which the local node is connected.

Then, the SC that has received the request of the broadcast transfer from the units within the local node may transmit the request to units subordinate to the crossbar to which the local node is connected, and a representative SC subordinate to a crossbar other than the crossbar to which the local node is connected.

Accordingly, if the broadcast transfer according to this embodiment is made, requests that pass between the SC 00 and the crossbar XB 00 are those for eight nodes. This is eight fifteenth of the amount of traffic of a conventional broadcast transfer.

Additionally, if the broadcast transfer according to this embodiment is made, requests that pass between the crossbars XB 00 and XB 01 are those for one node. This is one eighth of the amount of traffic of the conventional broadcast transfer.

As described above, the amount of traffic between an SC and a crossbar, and between crossbars, which is caused by a broadcast transfer, can be reduced. This can improve data transfer performance among nodes connected to different devices.

With the above described data transfer controlling apparatus, the amount of traffic among devices, which is caused by a data transfer among nodes connected to different devices, can be reduced.

What is claimed is:

1. A data transfer controlling apparatus for controlling a data transfer among a plurality of nodes in an information processing apparatus including a plurality of route switching devices to each of which a plurality of nodes are connected, the data transfer controlling apparatus comprising:
   a first controlling unit that performs a broadcast transfer to a plurality of processors within a first node connected to a first route switching device other than a processor which sends a request of the broadcast transfer, sends the request of the broadcast transfer to nodes other than the first node which are connected to the first route switching device, and requests a second node representing nodes connected to a second route switching device that is connected to the first route switching device to perform the broadcast transfer on behalf of nodes connected to the second route switching device when the first controlling unit receives the request of the broadcast transfer from the processor within the first node connected to the first route switching device; and
   a second controlling unit that performs a broadcast transfer to processors within the first node and sends a request of the broadcast transfer to nodes other than the first node which are connected to the first route switching device when the second controlling unit receives a request to perform the broadcast transfer on behalf of nodes connected to the first route switching device from the second node.

2. The data transfer controlling apparatus according to claim 1, wherein the first controlling unit comprises
   a request receiving unit that receives the request of the broadcast transfer from a device within the first node,
   a broadcast transfer data generating unit that generates broadcast transfer data transmitted to other devices within the first node,
   an acting request data generating unit that identifies the second node representing all the nodes connected to the second route switching device based on representative node information that is information about a representative node representing all the nodes connected to the second route switching device, and generates the request of the broadcast transfer,
   a broadcast transfer data transmitting unit that transmits the generated broadcast transfer data to the other devices within the first node, and
   an acting request data transmitting unit that transmits the request of the broadcast transfer to the second node.

3. The data transfer controlling apparatus according to claim 2, wherein the second controlling unit comprises
   a request receiving unit that receives a request from the first route switching device,
   an acting request determining unit that determines whether the request from the first route switching device is the request of the broadcast transfer,
   a broadcast transfer data generating unit that generates broadcast transfer data transmitted to the devices within the first node and the other nodes connected to the first route switching device when the first route switching device receives the request of the broadcast transfer, and
   a broadcast transfer data transmitting unit that transmits the broadcast transfer data to the devices within the first node and the other nodes connected to the first route switching device.

4. A data transfer controlling system for controlling a data transfer among a plurality of nodes in an information processing apparatus including a plurality of route switching devices to each of which a plurality of nodes are connected, the data transfer controlling system comprising:

a first controlling unit that performs a broadcast transfer to a plurality of processors within a first node connected to a first route switching device other than a processor which sends a request of the broadcast transfer, sends the request of the broadcast transfer to nodes other than the first node which are connected to the first route switching device, and requests a second node representing nodes connected to a second route switching device that is connected to the first route switching device to perform the broadcast transfer on behalf of nodes connected to the second route switching device when the first controlling unit receives the request of the broadcast transfer from the processor within the first node connected to the first route switching device; and a second controlling unit that performs the broadcast transfer to processors within the second node and sends a request of the broadcast transfer to nodes other than the second node which are connected to the second route switching device when the second controlling unit receives a request to perform the broadcast transfer on behalf of nodes connected to the second route switching device from the first node.

5. The data transfer controlling system according to claim 4, wherein the first controlling unit comprises a request receiving unit that receives the request of the broadcast transfer from a device within the first node, a broadcast transfer data generating unit that generates broadcast transfer data transmitted to other devices within the first node, an acting request data generating unit that identifies the second node representing all the nodes connected to the second route switching device based on representative node information that is information about a representative node representing all the nodes connected to the second route switching device, and generates the request of the broadcast transfer, a broadcast transfer data transmitting unit that transmits the generated broadcast transfer data to the other devices within the first node, and an acting request data transmitting unit that transmits the request of the broadcast transfer to the second node.

6. The data transfer controlling system according to claim 4, wherein the second controlling unit comprises a request receiving unit that receives a request from the second route switching device, an acting request determining unit that determines whether the request from the second route switching device is the request of the broadcast transfer, a broadcast transfer data generating unit that generates broadcast transfer data transmitted to devices within the second node, and other nodes connected to the second route switching device when the second route switching device receives the request of the broadcast transfer, and a broadcast transfer data transmitting unit that transmits the broadcast transfer data to the devices within the second node and the other nodes connected to the second route switching device.

7. A data transfer controlling method for controlling a data transfer among a plurality of nodes in an information processing apparatus including a plurality of route switching devices to each of which a plurality of nodes are connected, the data transfer controlling method comprising:

performing a broadcast transfer by a first controlling unit to a plurality of processors within a first node connected to a first route switching device other than a processor which sends a request of the broadcast transfer, sending the request of the broadcast transfer to nodes other than the first node which are connected to the first route switching device, and requesting a second node representing all nodes connected to a second route switching device that is connected to the first route switching device, to perform the broadcast transfer on behalf of nodes connected to the second route switching device when the first controlling unit receives the request of the broadcast transfer from the processor within the first node connected to the first route switching device; and performing a broadcast transfer by a second controlling unit to processors within the first node and sends a request of the broadcast transfer to nodes other than the first node which are connected to the first route switching device when the second controlling unit receives a request to perform the broadcast transfer on behalf of nodes connected to the first route switching device from the second node.

* * * * *